(12) United States Patent
Hamilton et al.

(10) Patent No.: US 12,468,765 B2
(45) Date of Patent: Nov. 11, 2025

(54) MACHINE LEARNING TECHNIQUES FOR GENERATING PERSONALIZED AUTOCOMPLETE PREDICTION

(71) Applicant: Optum, Inc., Minnetonka, MN (US)

(72) Inventors: Laura D. Hamilton, Chicago, IL (US); Ayush Tomar, Morgan Hill, CA (US); Vinit Garg, Fremont, CA (US); Lun Yu, San Francisco, CA (US)

(73) Assignee: Optum, Inc., Minnetonka, MN (US)

( * ) Notice: Subject to any disclaimer, the term of this patent is extended or adjusted under 35 U.S.C. 154(b) by 0 days.

(21) Appl. No.: 17/934,688

(22) Filed: Sep. 23, 2022

(65) Prior Publication Data

US 2024/0104091 A1    Mar. 28, 2024

(51) Int. Cl.
| | |
|---|---|
| G06F 16/9032 | (2019.01) |
| G06F 16/242 | (2019.01) |
| G06F 16/2457 | (2019.01) |
| G06F 16/9535 | (2019.01) |

(52) U.S. Cl.
CPC .... *G06F 16/90324* (2019.01); *G06F 16/2428* (2019.01); *G06F 16/24578* (2019.01); *G06F 16/9535* (2019.01)

(58) Field of Classification Search
None
See application file for complete search history.

(56) References Cited

U.S. PATENT DOCUMENTS

| | | | |
|---|---|---|---|
| 6,182,068 B1 | 1/2001 | Culliss | |
| 6,564,213 B1 | 5/2003 | Ortega et al. | |
| 6,738,754 B1 | 5/2004 | Norman, Jr. | |
| 7,657,522 B1 | 2/2010 | Puzicha et al. | |
| 7,933,859 B1 | 4/2011 | Puzicha et al. | |
| 8,100,829 B2 | 1/2012 | Rothman et al. | |
| 8,312,138 B2 | 11/2012 | Hull et al. | |
| 8,392,207 B2 | 3/2013 | Olaniyan | |
| 8,403,847 B2 | 3/2013 | Rothman et al. | |
| 8,583,450 B2 | 11/2013 | Baker et al. | |
| 8,620,842 B1 | 12/2013 | Cormack | |

(Continued)

FOREIGN PATENT DOCUMENTS

| | | |
|---|---|---|
| CA | 2816517 A1 | 4/2012 |
| CA | 2836381 A1 | 11/2012 |

(Continued)

OTHER PUBLICATIONS

"Clinical Management Guidelines for Obstetrician-Gynecologists", The American College Of Obstetricians and Gynecologists Practice Bulletin, No. 109, Dec. 2009, pp. 1-12.

(Continued)

*Primary Examiner* — Neveen Abel Jalil
*Assistant Examiner* — John J Morris
(74) *Attorney, Agent, or Firm* — Alston & Bird LLP

(57) ABSTRACT

Various embodiments of the present invention provide methods, apparatus, systems, computing devices, computing entities, and/or the like for performing personalized autocomplete predictions. Certain embodiments of the present invention utilize systems, methods, and computer program products that perform personalized autocomplete predictions using a general search corpus and/or individual curated search corpus.

18 Claims, 9 Drawing Sheets

(56) References Cited

U.S. PATENT DOCUMENTS

| | | |
|---|---|---|
| 8,706,530 B2 | 4/2014 | Ohnemus et al. |
| 8,793,252 B2 | 7/2014 | Subasic et al. |
| 8,972,397 B2 | 3/2015 | Imig et al. |
| 8,996,314 B2 | 3/2015 | Ohnemus et al. |
| 9,058,327 B1 | 6/2015 | Lehrman et al. |
| 9,424,532 B1 | 8/2016 | Abedini et al. |
| 9,436,760 B1 | 9/2016 | Tacchi et al. |
| 9,460,214 B1 | 10/2016 | Vuong et al. |
| 9,471,709 B1 | 10/2016 | Zinenko et al. |
| 9,977,866 B2 | 5/2018 | Norris et al. |
| 10,026,114 B2 | 7/2018 | Tolvanen et al. |
| 10,062,039 B1 | 8/2018 | Lockett |
| 10,176,541 B2 | 1/2019 | Chaudhri et al. |
| 10,262,384 B1 | 4/2019 | Albro et al. |
| 10,394,894 B2 | 8/2019 | Garg et al. |
| 10,409,874 B2 | 9/2019 | Cheng |
| 10,413,779 B2 | 9/2019 | Ingram et al. |
| 10,438,291 B1 | 10/2019 | Neben et al. |
| 10,489,440 B2 | 11/2019 | Sharma et al. |
| 10,770,184 B1 | 9/2020 | Mcnair |
| 10,789,309 B1 | 9/2020 | Bousquet et al. |
| 10,943,072 B1 | 3/2021 | Jaganmohan |
| 10,943,178 B1 | 3/2021 | Gao et al. |
| 10,977,254 B2 | 4/2021 | Claussenelias et al. |
| 11,004,135 B1 | 5/2021 | Sandler et al. |
| 11,055,324 B1 | 7/2021 | Inoue et al. |
| 11,238,113 B2 | 2/2022 | Freese et al. |
| 11,276,089 B1 | 3/2022 | Salehie et al. |
| 11,366,966 B1 | 6/2022 | Ramsey et al. |
| 11,416,535 B2 | 8/2022 | Counts et al. |
| 11,636,949 B2 | 4/2023 | Goldberg et al. |
| 11,748,413 B1 | 9/2023 | Yoon et al. |
| 11,775,989 B1 | 10/2023 | Hao et al. |
| 12,080,398 B2 | 9/2024 | Nida et al. |
| 2002/0103680 A1 | 8/2002 | Newman |
| 2003/0163349 A1 | 8/2003 | Ho |
| 2004/0019601 A1 | 1/2004 | Gates |
| 2004/0073538 A1 | 4/2004 | Leishman et al. |
| 2005/0060194 A1 | 3/2005 | Brown |
| 2005/0075931 A1 | 4/2005 | Pearson |
| 2005/0080786 A1 | 4/2005 | Fish et al. |
| 2005/0165627 A1 | 7/2005 | Fotsch et al. |
| 2006/0206264 A1 | 9/2006 | Rasmussen |
| 2008/0133272 A1 | 6/2008 | Marshall |
| 2009/0132573 A1 | 5/2009 | Reed, Jr. et al. |
| 2009/0254402 A1 | 10/2009 | Beall |
| 2009/0281719 A1 | 11/2009 | Jakobson |
| 2009/0292555 A1 | 11/2009 | Brown |
| 2010/0063846 A1 | 3/2010 | Shakamuri |
| 2010/0076786 A1 | 3/2010 | Dalton et al. |
| 2010/0131482 A1 | 5/2010 | Linthicum et al. |
| 2010/0131498 A1 | 5/2010 | Linthicum et al. |
| 2010/0179839 A1 | 7/2010 | Collins et al. |
| 2011/0077973 A1 | 3/2011 | Breitenstein et al. |
| 2011/0161110 A1 | 6/2011 | Mault |
| 2011/0264513 A1 | 10/2011 | Ratnaparkhi |
| 2012/0089413 A1 | 4/2012 | Balassanian |
| 2012/0296455 A1 | 11/2012 | Ohnemus et al. |
| 2013/0024474 A1 | 1/2013 | Kraft et al. |
| 2013/0073686 A1 | 3/2013 | Sandholm |
| 2013/0211858 A1 | 8/2013 | Ohnemus et al. |
| 2013/0232006 A1 | 9/2013 | Holcomb et al. |
| 2014/0067423 A1 | 3/2014 | Joao |
| 2014/0088986 A1 | 3/2014 | Gowdy et al. |
| 2014/0100860 A1 | 4/2014 | Stollmeyer et al. |
| 2014/0129493 A1 | 5/2014 | Leopold |
| 2014/0156308 A1 | 6/2014 | Ohnemus et al. |
| 2014/0280289 A1 | 9/2014 | Marantz et al. |
| 2014/0310013 A1 | 10/2014 | Ram et al. |
| 2014/0316811 A1 | 10/2014 | Ohnemus et al. |
| 2014/0372133 A1 | 12/2014 | Austrum et al. |
| 2015/0234987 A1 | 8/2015 | Laing et al. |
| 2015/0331878 A1* | 11/2015 | Joseph .............. G06Q 10/06 707/731 |
| 2016/0048646 A1 | 2/2016 | Stover et al. |
| 2016/0078101 A1* | 3/2016 | Somaiya ............ G06F 16/3322 707/706 |
| 2016/0085799 A1 | 3/2016 | Kim et al. |
| 2016/0092598 A1* | 3/2016 | Mishra ............... G06F 16/9535 707/740 |
| 2016/0110826 A1 | 4/2016 | Morimoto et al. |
| 2016/0140125 A1 | 5/2016 | Goyal et al. |
| 2016/0188619 A1 | 6/2016 | Su et al. |
| 2017/0109355 A1 | 4/2017 | Li et al. |
| 2017/0123618 A1 | 5/2017 | Porcella |
| 2017/0249713 A1 | 8/2017 | Serbinis et al. |
| 2017/0270115 A1 | 9/2017 | Cormack et al. |
| 2017/0293923 A1 | 10/2017 | Margolis et al. |
| 2017/0308583 A1 | 10/2017 | Husain et al. |
| 2018/0025334 A1 | 1/2018 | Pourfallah et al. |
| 2018/0082030 A1 | 3/2018 | Allen et al. |
| 2018/0165288 A1 | 6/2018 | Chang et al. |
| 2018/0341875 A1 | 11/2018 | Carr |
| 2019/0005409 A1 | 1/2019 | Doshi et al. |
| 2019/0163679 A1 | 5/2019 | Srinivasa et al. |
| 2019/0171728 A1* | 6/2019 | Wakankar ......... G06F 16/90324 |
| 2019/0188251 A1 | 6/2019 | Liu et al. |
| 2019/0228038 A1 | 7/2019 | Mishra |
| 2019/0325031 A1 | 10/2019 | Puzicha |
| 2019/0347323 A1 | 11/2019 | Riesa et al. |
| 2020/0005149 A1 | 1/2020 | Ramanath et al. |
| 2020/0073953 A1* | 3/2020 | Kulkarni ............... G06N 3/084 |
| 2020/0092695 A1 | 3/2020 | Vigeant et al. |
| 2020/0279641 A1 | 9/2020 | Nida et al. |
| 2020/0320139 A1 | 10/2020 | Duishoev et al. |
| 2020/0342010 A1 | 10/2020 | Rosomoff |
| 2020/0350072 A1 | 11/2020 | Mcewing et al. |
| 2020/0365259 A1 | 11/2020 | Chmait et al. |
| 2020/0388402 A1 | 12/2020 | Frey et al. |
| 2020/0411146 A1 | 12/2020 | Mcewing et al. |
| 2021/0019374 A1 | 1/2021 | Donaldson et al. |
| 2021/0027870 A1 | 1/2021 | West |
| 2021/0090694 A1 | 3/2021 | Colley et al. |
| 2021/0174164 A1* | 6/2021 | Hsieh ................ G06Q 30/0282 |
| 2021/0209095 A1 | 7/2021 | Gallant |
| 2021/0241204 A1 | 8/2021 | Stein |
| 2021/0295822 A1 | 9/2021 | Tomkins et al. |
| 2021/0319520 A1 | 10/2021 | Winters |
| 2021/0357187 A1 | 11/2021 | Clement et al. |
| 2021/0398077 A1 | 12/2021 | Lomurray et al. |
| 2022/0005566 A1 | 1/2022 | Lyman et al. |
| 2022/0035867 A1 | 2/2022 | Tambi et al. |
| 2022/0035869 A1 | 2/2022 | Beck et al. |
| 2022/0067841 A1 | 3/2022 | Hanson |
| 2022/0198573 A1 | 6/2022 | Brown et al. |
| 2022/0384052 A1 | 12/2022 | Gnanasambandam et al. |
| 2022/0405476 A1 | 12/2022 | Sar et al. |
| 2022/0405590 A1 | 12/2022 | Hebets |
| 2023/0138014 A1 | 5/2023 | Bjrkqvist |
| 2023/0169139 A1 | 6/2023 | Baek et al. |
| 2023/0170092 A1 | 6/2023 | Moon et al. |
| 2023/0252338 A1 | 8/2023 | Ayyadevara et al. |
| 2023/0283987 A1 | 9/2023 | Cheng et al. |
| 2023/0289524 A1 | 9/2023 | Prasad et al. |
| 2023/0359441 A1 | 11/2023 | Duan et al. |
| 2023/0394040 A1 | 12/2023 | Gupta et al. |
| 2023/0409614 A1 | 12/2023 | Hamilton et al. |
| 2024/0054326 A1 | 2/2024 | Dave et al. |
| 2024/0248901 A1 | 7/2024 | Krishnan et al. |
| 2024/0265431 A1 | 8/2024 | Jimnez et al. |
| 2024/0386330 A1 | 11/2024 | Ajmera et al. |

FOREIGN PATENT DOCUMENTS

| | | |
|---|---|---|
| CA | 2841006 A1 | 1/2013 |
| CN | 103329135 A | 9/2013 |
| CN | 107665217 A | 2/2018 |
| CN | 108304439 B | 7/2021 |
| EP | 2622568 A1 | 8/2013 |
| EP | 2710503 A1 | 3/2014 |
| EP | 2729912 A1 | 5/2014 |
| EP | 3156949 A2 | 4/2017 |
| IN | 201941028487 A | 1/2021 |
| WO | 2012/050969 A1 | 4/2012 |

(56) References Cited

FOREIGN PATENT DOCUMENTS

| | | |
|---|---|---|
| WO | 2012/156374 A1 | 11/2012 |
| WO | 2013/004706 A1 | 1/2013 |
| WO | 2014/087252 A2 | 6/2014 |

OTHER PUBLICATIONS

Chapelle, Olivier et al. "A Dynamic Bayesian Network Click Model For Web Search Ranking," In Proceedings of the 18th International Conference On World Wide Web, Apr. 20, 2009, pp. 1-10, Madrid, Spain, available online at https://citeseerx.ist.psu.edu/viewdoc/download?doi=10.1.1.180.337&rep=rep1&type=pdf.

Galli, Keith. Galli K. "High-Performance Intent Classification In Sparse Supervised Data Conditions," Doctoral Dissertation, Massachusetts Institute of Technology, Jun. 2019, (62 pages), available online: https://dspace.mit.edu/bitstream/handle/1721.1/123200/1128822757-MIT.pdf?sequence=1&isAllowed=y.

Hwang, Sewoong et al. "Toward A Chatbot For Financial Sustainability," Sustainability, vol. 13, No. 6:3173, Mar. 13, 2021, pp. 1-18, DOI: 10.3390/su13063173.

Li, Jianqiang et al. "Diversity-Aware Retrieval Of Medical Records," Computers In Industry, vol. 29, pp. 81-91, May 2015, DOI: http://dx.doi.org/10.1016/j.compind.2014.09.004.

Miller, Alissa S. et al. "Improving Stage Of Change In An Employee Wellness Program," Workplace Health & Safety, vol. 67, No. 8, pp. 381-290, Aug. 2019, DOI: 10.1177/2165079919838291.

Momma, Michinari et al. "Multi-Objective Relevance Ranking," In Proceedings of the SIGIR 2019 eCom Workshop, Jul. 2019, (8 pages), Paris, France, DOI: https://assets.amazon.science/6f/7f/a34aac77415ead5d4d518d5b1801/multi-objective-relevance-ranking.pdf.

Perrault, Evan K. et al. "Employees' Refusals To Participate In An Employer-Sponsored Wellness Program: Barriers and Benefits To Engagement," Compensation & Benefits Review, vol. 52, No. 1, p. 8-18, Jan. 2020, DOI: 10.1177/0886368719899209.

Sun, Xu et al. "Feature-Frequency-Adaptive On-Line Training For Fast and Accurate Natural Language Processing," Computational Linguistics, vol. 40, No. 3, pp. 563-586, Sep. 1, 2014, DOI: 10.1162/COLL_a_00193.

U.S. Provisional Patent Application, "Automated Health Data Acquisition, Processing and Communication System", U.S. Appl. No. 61/732,203, Unpublished (filed Nov. 30, 2012), (Peter Ohnemus, Inventor), 98 pages, US.

U.S. Provisional Patent Application, "Health Data Acquisition, Processing and Communication System", U.S. Appl. No. 61/387,906, Unpublished (filed Sep. 29, 2010), (Peter Ohnemus, Inventor), 31 pages, US.

U.S. Provisional Patent Application, "Health Data Acquisition, Processing and Communication System", U.S. Appl. No. 61/495,247, Unpublished (filed Jun. 9, 2011), (Peter Ohnemus, Inventor), 50 pages, US.

U.S. Provisional Patent Application, "System And Method For Personal Energy Expenditure Analyses", U.S. Appl. No. 61/486,658, Unpublished (filed May 16, 2011), (Peter Ohnemus, Inventor), 35 pages, US.

Wu, Qiang et al. "Adapting Boosting For Information Retrieval Measures," Learning To Rank For Information Retrieval, vol. 13, pp. 254-270, Jun. 2010, DOI: https://citeseerx.ist.psu.edu/viewdoc/download?doi=10.1.1.157.5117&rep=rep1&type=pdf.

Ahmad, Wasi Uddin et al. "Context Attentive Document Ranking and Query Suggestion," In Proceedings of the 42nd International ACM SIGIR Conference on Research and Development in Information Retrieval, Jul. 21-25, 2019, pp. 385-394, DOI: 10.1145/3331184.3331246.

Dao, Tien Tuan et al. "Knowledge-Based Personalized Search Engine For The Web-Based Human Musculoskeletal System Resources (HMSR) In Biomechanics," Journal of Biomedical Informatics, vol. 46, pp. 160-173, Feb. 1, 2013, (ePub: Nov. 10, 2012), DOI: 10.1016/j.jbi.2012.11.001.

Gupta, Jai et al. "Personalized Online Spell Correction For Personal Search," In Proceedings of the 2019 World Wide Web Conference (WWW'19), May 13-17, 2019, (7 pages), DOI: 10.1145/3308558.3313706.

McCreadie, Richard et al. "A Study of Personalised Medical Literature Search," In International Conference of the Cross-Language Evaluation Forum for European Languages, Sep. 15, 2014, pp. 74-85, Springer, Cham, DOI: 10.1007/978-3-319-11382-1_8.

Yadav, Nishant et al. "Session Aware Query Auto Completion Using Extreme Multi-Label Ranking," arXiv Preprint arXiv:2012.07654v2 [cs.IR], Jun. 7, 2021, (10 pages), available online: https://assets.amazon.science/5e/76/6ebacfc240e1a58b69a6f5347833/session-aware-query-auto-completion-using-extreme-multi-label-ranking.pdf.

International Search Report and Written Opinion for International Application No. PCT/US2023/015396, dated Jun. 19, 2023, (13 pages), European Patent Office, Rijswijk, Netherlands.

Lemoine, Julien, et al., "Predictive Search and Autocomplete", Algolia Blog, (14 pages), Dec. 6, 2022, Retrieved from the Internet https://web.archive.org/web/20221206165729/https://www.algolia.com/blog/ai/predictive-search-and-autocomplete/.

Non-Final Rejection Mailed on Jun. 20, 2024 for U.S. Appl. No. 18/314,441, 15 page(s).

Notice of Allowance and Fees Due (PTOL-85) Mailed on Aug. 7, 2024 for U.S. Appl. No. 17/971,491, 7 page (s).

Notice of Allowance and Fees Due (PTOL-85) Mailed on Aug. 23, 2024 for U.S. Appl. No. 18/484,943, 14 page (s).

Notice of Allowance and Fees Due (PTOL-85) Mailed on Aug. 28, 2024 for U.S. Appl. No. 17/971,491, 2 page (s).

Bao, et al., "Medical Code Prediction via Capsule Networks and ICD Knowledge", BMC Medical Informatics and Decision Making, vol. 21 (Suppl. 2):55, Jul. 30, 2021, (12 pages), doi.org/10.1186/s12911-021-01426-9.

Non-Final Rejection Mailed on Feb. 26, 2024 for U.S. Appl. No. 17/971,491, 11 page(s).

Notice of Allowance and Fees Due (PTOL-85) Mailed on Dec. 5, 2024 for U.S. Appl. No. 18/314,441, 10 page (s).

Notice of Allowance and Fees Due (PTOL-85) Mailed on Nov. 14, 2024 for U.S. Appl. No. 17/971,491, 2 page (s).

Notice of Allowance and Fees Due (PTOL-85) Mailed on Oct. 18, 2024 for U.S. Appl. No. 18/416,276, 2 page (s).

Notice of Allowance and Fees Due (PTOL-85) Mailed on Oct. 24, 2024 for U.S. Appl. No. 17/971,491, 2 page (s).

Non-Final Rejection Mailed on Sep. 10, 2024 for U.S. Appl. No. 18/520,662, 17 page(s).

Non-Final Rejection Mailed on Sep. 20, 2024 for U.S. Appl. No. 18/047,209, 46 page(s).

Notice of Allowance and Fees Due (PTOL-85) Mailed on Sep. 12, 2024 for U.S. Appl. No. 18/484,943, 4 page (s).

Notice of Allowance and Fees Due (PTOL-85) Mailed on Sep. 25, 2024 for U.S. Appl. No. 18/484,943, 4 page (s).

Notice of Allowance and Fees Due (PTOL-85) Mailed on Sep. 26, 2024 for U.S. Appl. No. 18/416,276, 10 page (s).

Corrected Notice of Allowance and Fees Due (PTOL-85), Sep. 12, 2024, U.S. Appl. No. 18/484,943, (4 pages).

NonFinal Office Action for U.S. Appl. No. 18/520,662, filed Sep. 10, 2024, (17 pages), U.S. Patent and Trademark Office, US.

Yan, et al., "A Survey of Automated International Classification of Diseases Coding: Development, Challenges, and Applications", Intelligent Medicine, vol. 2, pp. 161-173, Mar. 11, 2022, https://doi.org/10.1016/j.imed.2022.03.003.

Final Rejection Mailed on Mar. 17, 2025 for U.S. Appl. No. 18/520,662, 12 page(s).

Non-Final Rejection Mailed on Feb. 4, 2025 for U.S. Appl. No. 18/500,664, 40 page(s).

Notice of Allowance and Fees Due (PTOL-85) Mailed on Feb. 26, 2025 for U.S. Appl. No. 18/314,441, 7 page (s).

Advisory Action (PTOL-303) Mailed on May 28, 2025 for U.S. Appl. No. 18/520,662, 3 page(s).

Final Rejection Mailed on Apr. 24, 2025 for U.S. Appl. No. 18/047,209, 50 page(s).

Gupta, Prabhakar , "A Context-Sensitive Real-Time Spell Checker with Language Adaptability", IEEE, (Year: 2020), 7 pages.

(56) References Cited

OTHER PUBLICATIONS

Hienert, et al., "A Novel Combined Term Suggestion Service for Domain-Specific Digital Libraries", 12 pages, (Year: 2011).
Jalali, et al., "The Effect of Using Domain Specific Ontologies in Query Expansion in Medical Field", IEEE, (Year: 2008), 5 pages.
Non-Final Rejection Mailed on Jun. 16, 2025 for U.S. Appl. No. 18/520,662, 11 page(s).
Non-Final Rejection Mailed on Jun. 17, 2025 for U.S. Appl. No. 18/434,959, 15 page(s).
Non-Final Rejection Mailed on May 6, 2025 for U.S. Appl. No. 18/390,940, 11 page(s).
Non-Final Rejection Mailed on May 8, 2025 for U.S. Appl. No. 18/583,102, 18 page(s).
Soualmia, et al., The Effect of Using Domain Specific Ontologies in Query Expansion inBioinformatics, vol. 13, suppl. 14, (15 pages), 2012.
Final Rejection Mailed on Jul. 8, 2025 for U.S. Appl. No. 18/500,664, 21 page(s).
Notice of Allowance and Fees Due (PTOL-85) Mailed on Aug. 8, 2025 for U.S. Appl. No. 18/980,819, 10 page(s).
Non-Final Rejection Mailed on Sep. 17, 2025 for U.S. Appl. No. 18/527,910, 21 page(s).
Notice of Allowance and Fees Due (PTOL-85) Mailed on Sep. 30, 2025 for U.S. Appl. No. 18/390,940, 9 page(s).

\* cited by examiner

402A

Determine whether the particular candidate search result is in the general search corpus
501

In response to determining that the candidate search result is in the general search corpus, generate the trie-based frequency score for the particular candidate search result
502

Generate the session-agnostic autocomplete score based at least in part on the trie-based frequency score for the particular candidate search result
503

```
┌─────────────────────────────────────────────────────────┐
│ Determine whether the particular candidate search result is in the │
│         individual curated search result corpus         │
│                          601                            │
└─────────────────────────────────────────────────────────┘
                            │
                            ▼
┌─────────────────────────────────────────────────────────┐
│ In response to determining that the candidate search result is in │
│ the individual curated search corpus, generate an edit distance │
│   measure between the search query prefix and the particular    │
│                  candidate search result                │
│                          602                            │
└─────────────────────────────────────────────────────────┘
                            │
                            ▼
┌─────────────────────────────────────────────────────────┐
│ Generate the session-agnostic autocomplete score based at least in │
│              part on the edit distance measure          │
│                          603                            │
└─────────────────────────────────────────────────────────┘
```

```
┌─────────────────────────────────────────────────────────┐
│ Identify a corresponding search result cluster for the  │
│                  candidate search result                │
│                          701                            │
└─────────────────────────────────────────────────────────┘
                              │
                              ▼
┌─────────────────────────────────────────────────────────┐
│ Determine whether the corresponding search result       │
│ cluster is in a qualifying search result cluster set    │
│ for the search query prefix                             │
│                          702                            │
└─────────────────────────────────────────────────────────┘
                              │
                              ▼
┌─────────────────────────────────────────────────────────┐
│ In response to determining that the corresponding       │
│ search result cluster is in the qualifying search       │
│ result cluster, generate a per-cluster match result     │
│ indicator for the corresponding search result cluster   │
│                          703                            │
└─────────────────────────────────────────────────────────┘
                              │
                              ▼
┌─────────────────────────────────────────────────────────┐
│ In response to determining that the cluster match       │
│ result indicator is an affirmative per-cluster match    │
│ result indicator for the corresponding search result,   │
│ generate a qualifying result ranking score for the      │
│ candidate search result                                 │
│                          704                            │
└─────────────────────────────────────────────────────────┘
                              │
                              ▼
┌─────────────────────────────────────────────────────────┐
│ Generate the session-aware autocomplete score based at  │
│ least in part on the qualifying result ranking score    │
│                          705                            │
└─────────────────────────────────────────────────────────┘
```

```
┌─────────────────────────────────────────────────────────┐
│ Generate a relevant search result cluster subset based  │
│ at least in part on the search query prefix and the     │
│ search query session data object                        │
│                         801                             │
└─────────────────────────────────────────────────────────┘
                            │
                            ▼
┌─────────────────────────────────────────────────────────┐
│ Generate, a qualifying result ranking score for each    │
│ candidate search result within the relevant search      │
│ result cluster subset.                                  │
│                         802                             │
└─────────────────────────────────────────────────────────┘
                            │
                            ▼
┌─────────────────────────────────────────────────────────┐
│ Generate a session-aware autocomplete score for each    │
│ candidate search result based at least in part on the   │
│ qualifying result ranking score for the candidate       │
│ search result                                           │
│                         803                             │
└─────────────────────────────────────────────────────────┘
```

FIG. 8

MACHINE LEARNING TECHNIQUES FOR GENERATING PERSONALIZED AUTOCOMPLETE PREDICTION

BACKGROUND

Various embodiments of the present invention address technical challenges related to performing autocomplete predictions and disclose innovative techniques for efficiently and effectively performing personalized autocomplete predictions.

BRIEF SUMMARY

In general, various embodiments of the present invention provide methods, apparatus, systems, computing devices, computing entities, and/or the like for performing personalized autocomplete predictions for a search query prefix. Certain embodiments of the present invention utilize systems, methods, and computer program products that perform personalized autocomplete predictions utilizing one or more of a general search corpus, an individual curated search corpus, a per-cluster matching machine learning model, and a cross-cluster ranking machine learning model.

In accordance with one aspect, a method is provided. In one embodiment, the method comprises: for each candidate search result in a candidate search result corpus that comprises the individual curated search corpus and a general search corpus: generating a session-agnostic autocomplete score for the candidate search result, wherein: (i) if the candidate search result is in the individual curated search corpus, the session-agnostic autocomplete score for the candidate search result is generated based at least in part on an edit distance measure between the search query prefix and the particular candidate search result, and (ii) if the candidate search result is in the general search corpus, the session-agnostic autocomplete score for the candidate search result is generated based at least in part on a trie-based frequency score that is generated based at least in part on: (a) whether the candidate search result is in a qualifying trie leaf node subset of a general search result corpus trie data object for the general search result corpus, and (b) a general corpus historical frequency score for the candidate search result, generating a session-aware autocomplete score for the candidate search result, comprising: identifying a corresponding search result cluster for the candidate search result, determining whether the corresponding search result cluster is in a qualifying search result cluster set for the search query prefix, and in response to determining that the corresponding search result cluster is in the qualifying search result cluster: (i) generating, based at least in part on the search query prefix and the search query session data object, and using a per-cluster matching machine learning model for the corresponding search result cluster, a per-cluster match result indicator for the corresponding search result cluster, and (ii) in response to determining that the per-cluster match result indicator for the corresponding search result cluster is an affirmative per-cluster match result indicator: (a) generating, using a cross-cluster ranking machine learning model, a qualifying result ranking score for the candidate search result within a qualifying search result subset of the candidate search result corpus that are associated with search result clusters having affirmative per-cluster match result indicators, and (ii) generating the session-aware autocomplete score for the candidate search result based at least in part on the qualifying result ranking score for the candidate search result, and generating, based at least in part on the session-agnostic autocomplete score and the session-aware autocomplete score, a hybrid autocomplete score for the candidate search result; generating the ranked autocomplete prediction based at least in part on each hybrid autocomplete score; and performing one or more prediction-based actions based at least in part on the ranked autocomplete prediction.

In accordance with another aspect, a computer program product is provided. The computer program product may comprise at least one computer-readable storage medium having computer-readable program code portions stored therein, the computer-readable program code portions comprising executable portions configured to: for each candidate search result in a candidate search result corpus that comprises the individual curated search corpus and a general search corpus: generating a session-agnostic autocomplete score for the candidate search result, wherein: (i) if the candidate search result is in the individual curated search corpus, the session-agnostic autocomplete score for the candidate search result is generated based at least in part on an edit distance measure between the search query prefix and the particular candidate search result, and (ii) if the candidate search result is in the general search corpus, the session-agnostic autocomplete score for the candidate search result is generated based at least in part on a trie-based frequency score that is generated based at least in part on: (a) whether the candidate search result is in a qualifying trie leaf node subset of a general search result corpus trie data object for the general search result corpus, and (b) a general corpus historical frequency score for the candidate search result, generating a session-aware autocomplete score for the candidate search result, comprising: identifying a corresponding search result cluster for the candidate search result, determining whether the corresponding search result cluster is in a qualifying search result cluster set for the search query prefix, and in response to determining that the corresponding search result cluster is in the qualifying search result cluster: (i) generating, based at least in part on the search query prefix and the search query session data object, and using a per-cluster matching machine learning model for the corresponding search result cluster, a per-cluster match result indicator for the corresponding search result cluster, and (ii) in response to determining that the per-cluster match result indicator for the corresponding search result cluster is an affirmative per-cluster match result indicator: (a) generating, using a cross-cluster ranking machine learning model, a qualifying result ranking score for the candidate search result within a qualifying search result subset of the candidate search result corpus that are associated with search result clusters having affirmative per-cluster match result indicators, and (ii) generating the session-aware autocomplete score for the candidate search result based at least in part on the qualifying result ranking score for the candidate search result, and generating, based at least in part on the session-agnostic autocomplete score and the session-aware autocomplete score, a hybrid autocomplete score for the candidate search result; generating the ranked autocomplete prediction based at least in part on each hybrid autocomplete score; and performing one or more prediction-based actions based at least in part on the ranked autocomplete prediction.

In accordance with yet another aspect, an apparatus comprising at least one processor and at least one memory including computer program code is provided. In one embodiment, the at least one memory and the computer program code may be configured to, with the processor, cause the apparatus to: for each candidate search result in a candidate search result corpus that comprises the individual curated search corpus and a general search corpus: generating a session-agnostic autocomplete score for the candidate search result, wherein: (i) if the candidate search result is in the individual curated search corpus, the session-agnostic autocomplete score for the candidate search result is generated based at least in part on an edit distance measure between the search query prefix and the particular candidate search result, and (ii) if the candidate search result is in the general search corpus, the session-agnostic autocomplete score for the candidate search result is generated based at least in part on a trie-based frequency score that is generated based at least in part on: (a) whether the candidate search result is in a qualifying trie leaf node subset of a general search result corpus trie data object for the general search result corpus, and (b) a general corpus historical frequency score for the candidate search result, generating a session-aware autocomplete score for the candidate search result, comprising: identifying a corresponding search result cluster for the candidate search result, determining whether the corresponding search result cluster is in a qualifying search result cluster set for the search query prefix, and in response to determining that the corresponding search result cluster is in the qualifying search result cluster: (i) generating, based at least in part on the search query prefix and the search query session data object, and using a per-cluster matching machine learning model for the corresponding search result cluster, a per-cluster match result indicator for the corresponding search result cluster, and (ii) in response to determining that the per-cluster match result indicator for the corresponding search result cluster is an affirmative per-cluster match result indicator: (a) generating, using a cross-cluster ranking machine learning model, a qualifying result ranking score for the candidate search result within a qualifying search result subset of the candidate search result corpus that are associated with search result clusters having affirmative per-cluster match result indicators, and (ii) generating the session-aware autocomplete score for the candidate search result based at least in part on the qualifying result ranking score for the candidate search result, and generating, based at least in part on the session-agnostic autocomplete score and the session-aware autocomplete score, a hybrid autocomplete score for the candidate search result; generating the ranked autocomplete prediction based at least in part on each hybrid autocomplete score; and performing one or more prediction-based actions based at least in part on the ranked autocomplete prediction.

BRIEF DESCRIPTION OF THE SEVERAL VIEWS OF THE DRAWINGS

Reference will now be made to the accompanying drawings, which are not necessarily drawn to scale, and wherein:

FIG. 5 provides a flowchart diagram of an example process for generating a session-agnostic autocomplete score for a candidate search result in accordance with some embodiments discussed herein.

FIG. 6 provides a flowchart diagram of an example process for generating a session-agnostic autocomplete score for a candidate search result in accordance with some embodiments discussed herein.

FIG. 7 provides a flowchart diagram of an example process for generating a session-aware autocomplete score for a candidate search result accordance with some embodiments discussed herein.

FIG. 8 provides a flowchart diagram of an example process for generating a session-aware autocomplete score for a particular candidate search result accordance with some embodiments discussed herein.

DETAILED DESCRIPTION

Figure 1:
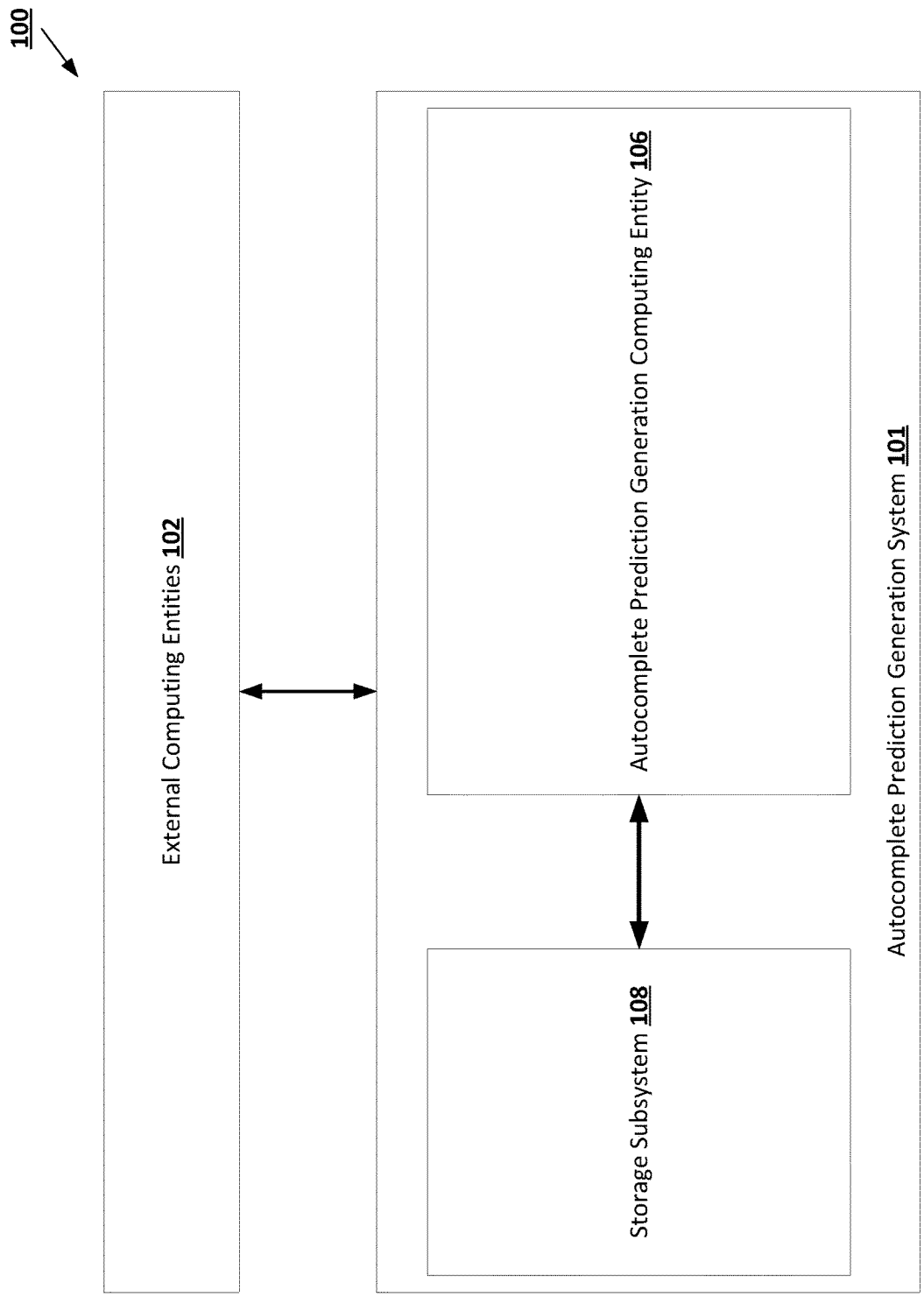
FIG. 1 provides an exemplary overview of an architecture that can be used to practice embodiments of the present invention.

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to autocomplete prediction for healthcare related searches and/or healthcare-related search platforms, one of ordinary skill in the art will recognize that the disclosed concepts can be used to perform other types of autocomplete predictions (e.g., autocomplete predictions for non-healthcare-related searches and/or non-healthcare-related applications).

I. Overview and Technical Advantages

Various embodiments of the present invention provide machine learning solutions for improving search accuracy in a search platform that is configured to generate search results for search queries that enables gathering insights from multiple ranking mechanisms to generate autocomplete suggestions for partial search query. This leads to a search platform that can enable a user to formulate semantically-enriched search queries. In this way, various embodiments of the present invention reduce the need for end-users of search platforms to do repeated search operations with more precise search queries, which in turn reduces the overall number of search queries transmitted to a search platform and hence the operational load of the search platform. In this way, by reducing the operational load on search platforms, various embodiments of the present invention improve operational reliability and computational efficiency of search platforms.

An exemplary application of various embodiments of the present invention relates to generating autocomplete suggestions for healthcare-related searches. When a user (e.g., individual) performs a search on a mobile app or website, the user expects to see autocomplete or type-ahead suggestions with a set of plausible complete search phrase. The user can then click on one of the suggested search queries to see the results for those queries, which will save the user some typing and reduce the likelihood of misspelling. In the healthcare and medical space, for example, search terms are often hard to spell and can be very highly specialized. Various embodiments of the present invention relate to generating personalized autocomplete suggestions (autocomplete prediction) for a user based at least in part on user-specific data (e.g., the user's personal medical history). For example, consider the beginning string of a search query "phys". For a user (e.g., a health insurer/healthcare platform member) who has previously visited "physicians immediate care" in west loop three times in the past 9 months, the first autocomplete suggestion might be "physicians immediate care west loop." For a user who has never had a visit at "physician's immediate care," and perhaps doesn't even live within 50 miles of "physician's immediate care" but has a bad back or a recent sports injury, the top-ranked autocomplete suggestion for "phys" could be "physical therapy near me." Now consider a member with no known injuries who is overdue for her annual physical exam, and based at least in part on her prior activity is due for an annual physical exam, the top-ranked autocomplete suggestion might be "physical exam."

II. Definitions of Certain Terms

The term "query generating user profile" may refer to a data object that comprise data associated with and/or representative of a user of a plurality of users. In some embodiments, the query generating user profile may be associated with a user with respect to a real-world entity (e.g., business entity) and/or a search platform (e.g., a search engine). Examples of query generating user profile data include user identifier data, demographic information data, user activity data, and/or other data associated with the user. In some embodiments, the query generating user profile may comprise data in the form of text strings(s), numerical character(s), alphabetical character(s), alphanumeric code(s), American Standard Code for Information Interchange (ASCII) character(s), and/or the like. An example of a query generating user profile is a healthcare-related query generating user profile comprising data associated with and/or representative of an individual associated with a corresponding health insurance provider, healthcare platform, and/or the like (e.g., a member of a health insurance plan). In some embodiments, a query generating user profile may be associated with one or more search query session data objects. For example, a query generating user profile may be associated with one or more historical search query sessions with respect to a search platform and/or may be associated with a current search query with respect to search platform (e.g., a healthcare search platform).

The term "ranked autocomplete prediction" may refer to a data object configured to describe a ranked list of one or more candidate search results (e.g., ranked list of autocomplete suggestions) generated for a query generating user profile during a search query entry based at least in part on a search query prefix. In some embodiments, the ranked autocomplete prediction may be generated based at least in part on a general search corpus and/or an individual curated search corpus. In some embodiments, the ranked autocomplete prediction may be configured to be displayed on a display device of a client computing entity. In some embodiments, the ranked autocomplete prediction may be displayed in a drop-down box on the display device of the client computing entity.

The term "search query session data object" may refer to a data object configured to describe data associated with a search query session. A search query session may describe a series of search queries with respect to a query generating user profile performed by the corresponding user within a short time period. For example, in some embodiments, a search query session may describe a series of search queries with respect to a query generating user profile performed within a defined window (e.g., 90 seconds, last 300 seconds, and/or the like). In some embodiments, a search query session data object may describe and/or comprise the previous search query before a search query prefix in search query session. For example, the search query session data object may comprise the immediately preceding search query relative to a search query prefix. A search query may describe an information request by a query generating user profile. In some embodiments, a search query may be entered into a search query box associated with a search platform configured to return search results (if any) in response to a search query. In some embodiments, a search query prefix may be entered into a search query box via keyboard and/or voice recognition. An example of a search query is an information request for healthcare-related information by a query generating user profile. Examples of data associated with a search query may include the corresponding search query prefix (e.g., entered by the query generating user profile), the search terms within the search query, the autocomplete prediction (e.g., one or more candidate search results), the search results returned in response to the search query, and/or the like.

The term "search query prefix" may refer to a data entity configured to describe a beginning portion of a search query. In some embodiments, a search query prefix may comprise one or more letters and/or characters of a search query that do not comprise the complete search query. For example, in some embodiments, a search query prefix may comprise one or more letters and/or characters entered into a search query box (e.g., user interface associated with a search engine) by a user during a search query entry before the user completes the search query. In various embodiments, an autocomplete prediction (e.g., one or more ranked autocomplete suggestions) may be generated based at least in part on a search query prefix. In some embodiments, the search query prefix may be in the form of text strings(s), numerical character(s), alphabetical character(s), alphanumeric code(s), American Standard Code for Information Interchange (ASCII) character(s), and/or the like. Consider for example, a search query entry associated with a query generating user profile, where the corresponding user begins to enter "Phys" during the search query entry. In the noted example, the search query prefix may comprise "Phys" and an autocomplete prediction (search query suggestions) such as "Physical therapy near me" may be generated based at least in part on the "Phys" search query prefix.

The term "candidate search result" may describe a data entity configured to describe a possible autocomplete suggestion (e.g., possible search query) with respect to a search query prefix. In some embodiments, a candidate search result may be analyzed and/or processed with respect to a search query prefix to generate one or more scores, which may in turn be used to generate an autocomplete prediction with respect to the search query prefix. For example, in some embodiments, for each candidate search result, a session-agnostic autocomplete score and/or a session-aware autocomplete score may be generated with respect to a search query prefix, which may in turn be used to generate an autocomplete prediction with respect to the search query prefix. In some embodiments, a candidate search result may be associated with a general search corpus and/or an individual curated search corpus associated with a query generating user profile.

The term "general search corpus" may refer to a data object configured to describe a list of non-user specific possible candidate search result. In some embodiments, the general search corpus may be generated based at least in part on historical search query data (e.g., search terms, and/or the like) associated with the plurality of query-generating user profiles. For example, in some embodiments, the general search corpus may comprise each historical search term and/or historical phrase associated with the plurality of query-generating user profiles over a define period of time. In some embodiments, the general search corpus may comprise data in the form of text strings(s), numerical character(s), alphabetical character(s), alphanumeric code(s), American Standard Code for Information Interchange (ASCII) character(s), and/or the like. In some embodiments, the general search corpus may be represented in the form of a trie data object, where a trie data object may describe a search tree (e.g., a binary search tree) that comprise a plurality of nodes (e.g., root nodes, intermediate nodes, and leaf nodes) that may be associated with a key and/or a value and may be connected via edges. In some embodiments, each leaf node of a trie data object may store a candidate search result. Additionally, in some embodiments, one or more intermediate nodes may store and/or represent candidate search results. In some embodiments, each node (e.g., leaf node) storing and/or representing a candidate search result may be associated with a general corpus historical frequency score that describes the frequency of occurrence of the candidate search result with respect to historical search queries over a period of time. For example, the general corpus historical frequency score associated with a node storing and/or representing a candidate search result may describe the number of times the particular candidate search result appeared within historical search queries over a defined period of time. In some embodiments, a session-agnostic autocomplete score for a candidate search result may be generated based at least in part on the general corpus historical frequency score for the candidate search result.

The term "individual curated search corpus" may refer to a data object that comprise data associated with a query-generating user profile, where in some embodiments, an autocomplete prediction may be generated for the query-generating user profile with respect to a search query prefix based at least in part on the individual curated search corpus. In some embodiments, an individual curated search corpus may include data associated with the corresponding user's historical search queries, data associated with the corresponding user's personal information, data associated with historical events associated with the corresponding user, demographic data, and/or other data. In some embodiments, data associated with the user's historical search queries may include historical search terms associated with historical search session(s) by the user over a defined period of time. In some embodiments, the historical search query data may comprise all historical search terms within a defined period of time. In some embodiments, the historical search query data may comprise only historical search terms associated with a search result (e.g., that yielded a search result). In some embodiments, the corresponding user's personal information may include the user's name, age, demographic information, historical event data, historical medical data, and/or the like. For example, in some embodiments (such as where the search platform is a healthcare search platform that may be configured at least in part for providing healthcare-related search results in response to healthcare-related search queries), the corresponding user's personal information may include the user's name under a medical plan, the user's medical/health history (such as diagnosis, procedures, health/medical-related visits, claims data, associated temporal data (e.g., date and/or time)), and/or the like. Continuing with the medical context example, in some embodiments, historical event data may include data such as provider designator (e.g., provider name) associated with historical medical visits (e.g., hospital visit, pharmacy visit, immediate care center visit, laboratory visit, doctor visit, and/or the like). In some embodiments, an individual curated search corpus may additionally include augmented data. For example, continuing with the medical context example, in some embodiments, an individual curated search corpus may include augmented diagnosis data (e.g., ICD codes), augmented procedure data (e.g., procedure codes), augmented provider designators, and/or the like. In some embodiments, an autocomplete prediction may be generated for a particular query generating user profile with respect to a search query prefix based at least in part on the individual curated search corpus, where the autocomplete prediction may be representative of personalized autocomplete prediction.

The term "session agnostic autocomplete score" may refer to a data entity configured to describe a non-session-based estimated measure of the likelihood that a candidate search result (e.g., candidate autocomplete string) in a candidate search result corpus that comprises a general search corpus and an individual curated search corpus (with respect to a query generating user profile) is a matching autocomplete prediction with respect to a search query prefix associated with the query generating user profile.

The term "session aware agnostic autocomplete score" may refer to a data entity configured to describe a session-based estimated measure of the likelihood that a candidate search result (e.g. candidate autocomplete string) in candidate search result that comprises a general search corpus and an individual curated search corpus (with respect to a query generating user profile) is a matching autocomplete prediction with respect to a search query prefix associated with the query generating user profile.

The term "per cluster matching machine learning model" may refer to a data construct that is configured to describe parameters, hyper-parameters, and/or defined operations of a machine learning model that in some embodiments is configured to generate based at least in part on a search query prefix and corresponding search query data object associated with a query-generating user profile, a per-cluster match result indicator for a search result cluster. In some embodiments, the per cluster matching machine learning model is configured to generate based at least in part on the search query prefix and the search query session data object, a relevant search result cluster subset of the plurality of search result clusters. In some embodiments, a relevant search result cluster subset may describe and/or comprise search result clusters comprising one or more candidate search results that match the search query prefix in the context of the search query session data object.

The term "cross-cluster ranking machine learning model" may refer to a data construct that is configured to describe parameters, hyper-parameters, and/or defined operations of a machine learning model that is configured to generate a qualifying result ranking score for a candidate search result within a qualifying search result subset of a candidate search result corpus that are associated with search result clusters having affirmative per-cluster match result indicator.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like, executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing autocomplete prediction. The architecture 100 includes an autocomplete prediction generation system 101 configured to receive autocomplete prediction requests from external computing entities 102, process the autocomplete prediction requests to generate predictions, provide the generated predictions to the external computing entities 102, and automatically perform prediction-based actions based at least in part on the generated predictions.

An example of a prediction-based action that can be performed using the autocomplete prediction generation system 101 is a request to generate autocomplete search query suggestion for a search prefix with respect to a query-generating user profile. When a user (e.g., individual) performs a search on a mobile app or website, the user expects to see autocomplete suggestions with a set of plausible complete search phrase. The user can then click on one of the suggested search queries to see the results for those queries, which will save the user some typing and reduce the likelihood of misspelling. In the healthcare and medical space, for example, search terms are often hard to spell and can be very highly specialized. Various embodiments of the present invention relate to generating personalized autocomplete suggestions (autocomplete prediction) for a user based at least in part user-specific data (e.g., the user's personal medical history and data). As noted above, while certain embodiments of the present invention are described with reference to autocomplete prediction for healthcare-related searches and/or healthcare-related search platforms, one of ordinary skill in the art will recognize that the disclosed concepts can be used to perform other types of autocomplete predictions (e.g., autocomplete predictions for non-healthcare-related searches and/or non-healthcare-related applications).

In some embodiments, the autocomplete prediction generation system 101 may communicate with at least one of the external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software, and/or firmware required to implement it (such as, e.g., network routers, and/or the like).

The autocomplete prediction generation system 101 may include an autocomplete prediction generation computing entity 106 and a storage subsystem 108. The autocomplete prediction generation computing entity 106 may be configured to receive autocomplete prediction requests from one or more external computing entities 102, process the autocomplete prediction requests to generate predictions corresponding to the autocomplete prediction requests, provide the generated predictions to the external computing entities 102, and automatically perform prediction-based actions based at least in part on the generated predictions.

The storage subsystem 108 may be configured to store input data used by the autocomplete prediction generation computing entity 106 to perform autocomplete prediction, as well as model definition data used by the autocomplete prediction generation computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Autocomplete Prediction Generation Computing Entity

Figure 2:
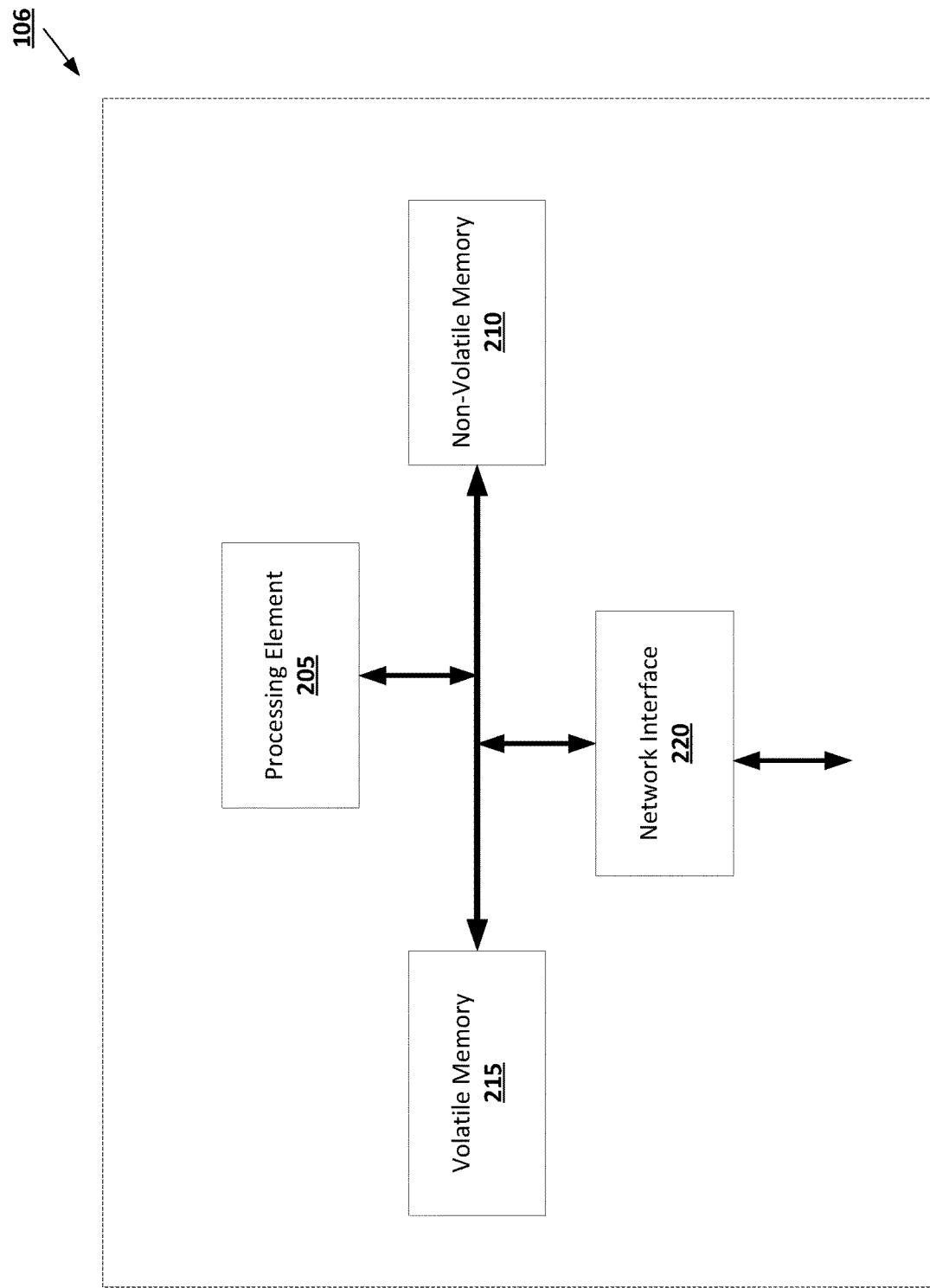
FIG. 2 provides an example autocomplete prediction generation computing entity in accordance with some embodiments discussed herein.

FIG. 2 provides a schematic of an autocomplete prediction generation computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the autocomplete prediction generation computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the autocomplete prediction generation computing entity 106 may include, or be in communication with, one or more processing elements 205 (also referred to as processors, processing circuitry, and/or similar terms used herein interchangeably) that communicate with other elements within the autocomplete prediction generation computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the autocomplete prediction generation computing entity 106 may further include, or be in communication with, non-volatile media (also referred to as non-volatile storage, memory, memory storage, memory circuitry, and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the autocomplete prediction generation computing entity 106 may further include, or be in communication with, volatile media (also referred to as volatile storage, memory, memory storage, memory circuitry, and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the autocomplete prediction generation computing entity 106 with the assistance of the processing element 205 and operating system.

As indicated, in one embodiment, the autocomplete prediction generation computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the autocomplete prediction generation computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the autocomplete prediction generation computing entity 106 may include, or be in communication with, one or more input elements, such as a keyboard input, a mouse input, a touch screen/display input, motion input, movement input, audio input, pointing device input, joystick input, keypad input, and/or the like. The autocomplete prediction generation computing entity 106 may also include, or be in communication with, one or more output elements (not shown), such as audio output, video output, screen/display output, motion output, movement output, and/or the like.

Exemplary External Computing Entity

Figure 3:
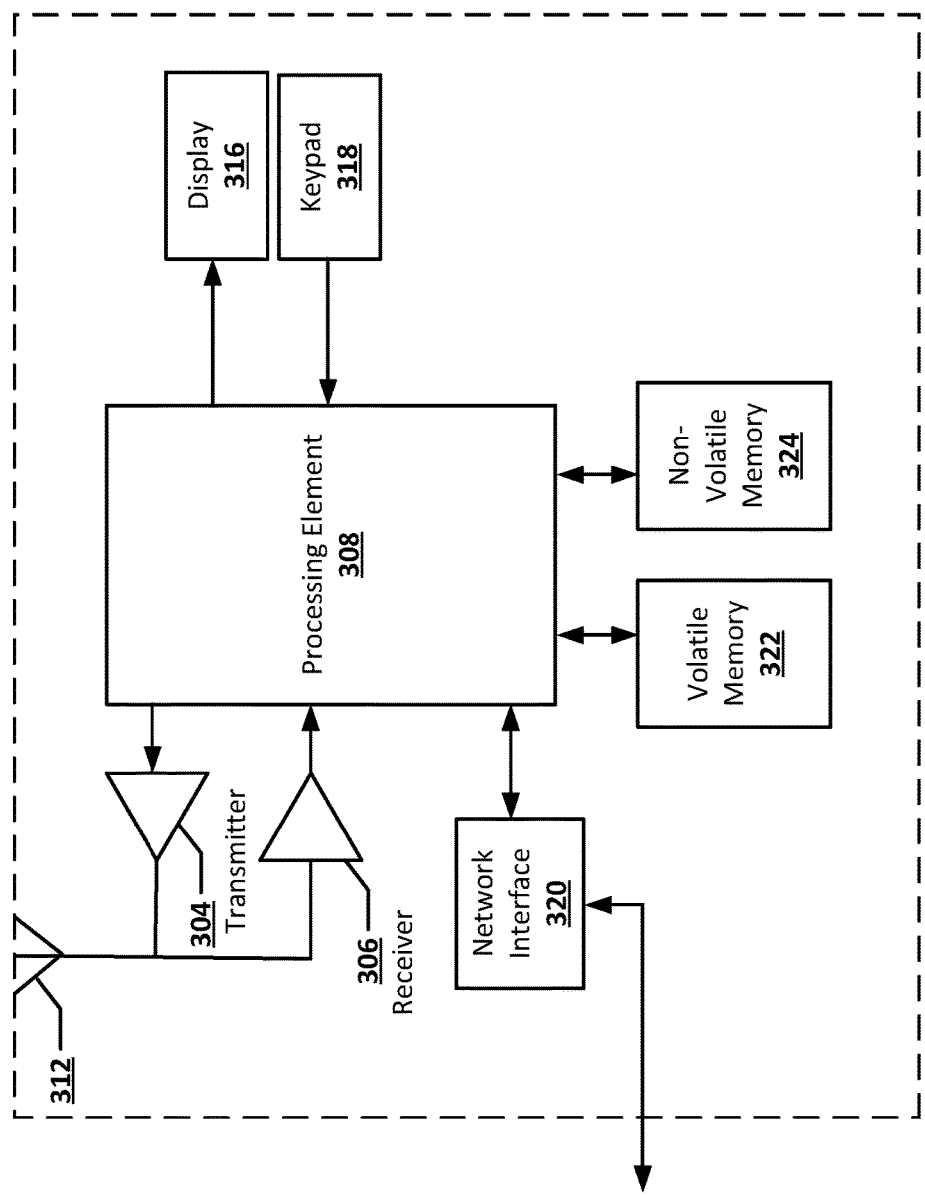
FIG. 3 provides an example external computing entity in accordance with some embodiments discussed herein.

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the autocomplete prediction generation computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the autocomplete prediction generation computing entity 106 via a network interface 320.

Via these communication standards and protocols, the external computing entity 102 can communicate with various other entities using concepts, such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies, including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the autocomplete prediction generation computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102, and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the autocomplete prediction generation computing entity 106 and/or various other computing entities.

In another embodiment, the external computing entity 102 may include one or more components or functionalities that are the same or similar to those of the autocomplete prediction generation computing entity 106, as described in greater detail above. As will be recognized, these architectures and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

As described below, various embodiments of the present invention provide machine learning solutions for improving search accuracy in a search platform that is configured to generate search results for search queries that enables gathering insights from multiple ranking mechanisms to generate autocomplete suggestions for partial search query. This leads to a search platform that can enable a user to formulate semantically-enriched search queries. In this way, various embodiments of the present invention reduce the need for end-users of search platforms to do repeated search operations with more precise search queries, which in turn reduces the overall number of search queries transmitted to a search platform and hence the operational load of the search platform. In this way, by reducing the operational load on search platforms, various embodiments of the present invention improve operational reliability and computational efficiency of search platforms.

In various embodiments, the autocomplete prediction generation computing entity 106 may be configured to generate a ranked autocomplete prediction for a search query prefix with respect to a query-generating user profile associated with the search query prefix based at least in part on generating a hybrid autocomplete score (described further below with reference to example process 400) for one or more candidate search results, and generating the ranked autocomplete prediction based at least in part on the hybrid autocomplete score for each of the one or more candidate search results, where a first candidate search result with a higher hybrid autocomplete score relative to a second candidate search result may be associated with a higher ranking value.

In various embodiments, for a given candidate search result, the hybrid autocomplete score may be generated based at least in part on generating a weighted sum of one or more of a trie-based frequency score for the candidate search result, an edit distance measure for the candidate search result, and a session-aware autocomplete score for the candidate search result (described further below with reference to example process 400).

In various embodiments, a trie-based frequency score may be generated for a candidate search result if the candidate search result is in a general search corpus. In various embodiments, an edit distance measure may be generated for a candidate search result if the candidate search result is in an individual curated search corpus for the query generating user profile associated with the search query prefix. For example, in some embodiments, a trie-based frequency score and an edit distance measure may be generated for a candidate search result if the candidate search result is in both the general search corpus and the individual curated search corpus for the query generating user profile.

In various embodiments, an individual curated search corpus may or may not exist for a given query generating user profile. For example, an individual curated search corpus for a new user. The autocomplete prediction generation computing entity 106 may be configured to generate an individual curated search corpus for the new user that may be utilized to generate edit distance measure for respective candidate search results in the individual curated search corpus for the user when subsequent autocomplete prediction are requested (e.g., next log on by the user).

In various embodiments, a session-aware autocomplete score may be generated for a candidate search result based at least in part on whether: (i) the search query prefix is associated with a search query session (e.g., whether the search query prefix is part of a series of search queries by the query generating user profile in a short period of time) and (ii) a previous search query exists in the associated search query session with respect to the search query prefix (e.g., whether there is an immediately preceding search query relative to the search query prefix in the search query session). For example, in some embodiments a session-aware autocomplete score may be generated for a candidate search result only if: (i) the search query prefix is associated with a search query session and (ii) a previous search query exists in the associated search query session relative to the search query prefix. For example, a search query prefix that is the first search query prefix in a search query session and/or or is the first search query prefix entered in the search query box by a user when the user logs on to the search platform, a session-aware autocomplete score may not be generated for any candidate search results. In the noted example, the hybrid autocomplete score may be generated based at least in part on the trie-based frequency score for one or more candidate search results or based at least in part on the weighted sum of the trie-based frequency score for one or more candidate search results and edit distance measure for one or more candidate search results.

In some embodiments, if the candidate search result is in both the general search corpus and an individual curated search corpus, a trie based frequency score may not be generated for the candidate search result. In the noted embodiment, this may further improve computational efficiency while, as described above, still enabling a user to formulate semantically-enriched search queries which reduce the need for end-users of search platforms to do repeated search operations with more precise search queries, which in turn reduces the overall number of search queries transmitted to a search platform and hence the operational load of the search platform. Thus, improving operational reliability and computational efficiency of search platforms. A trie-based frequency score for a candidate search result, an edit distance measure for a candidate search result, and a session-aware score for a candidate search result may be generated utilizing one or more of a variety of methods. The example process 400 below describes some these methods that may be used in accordance with some embodiments of the present invention.

Figure 4:
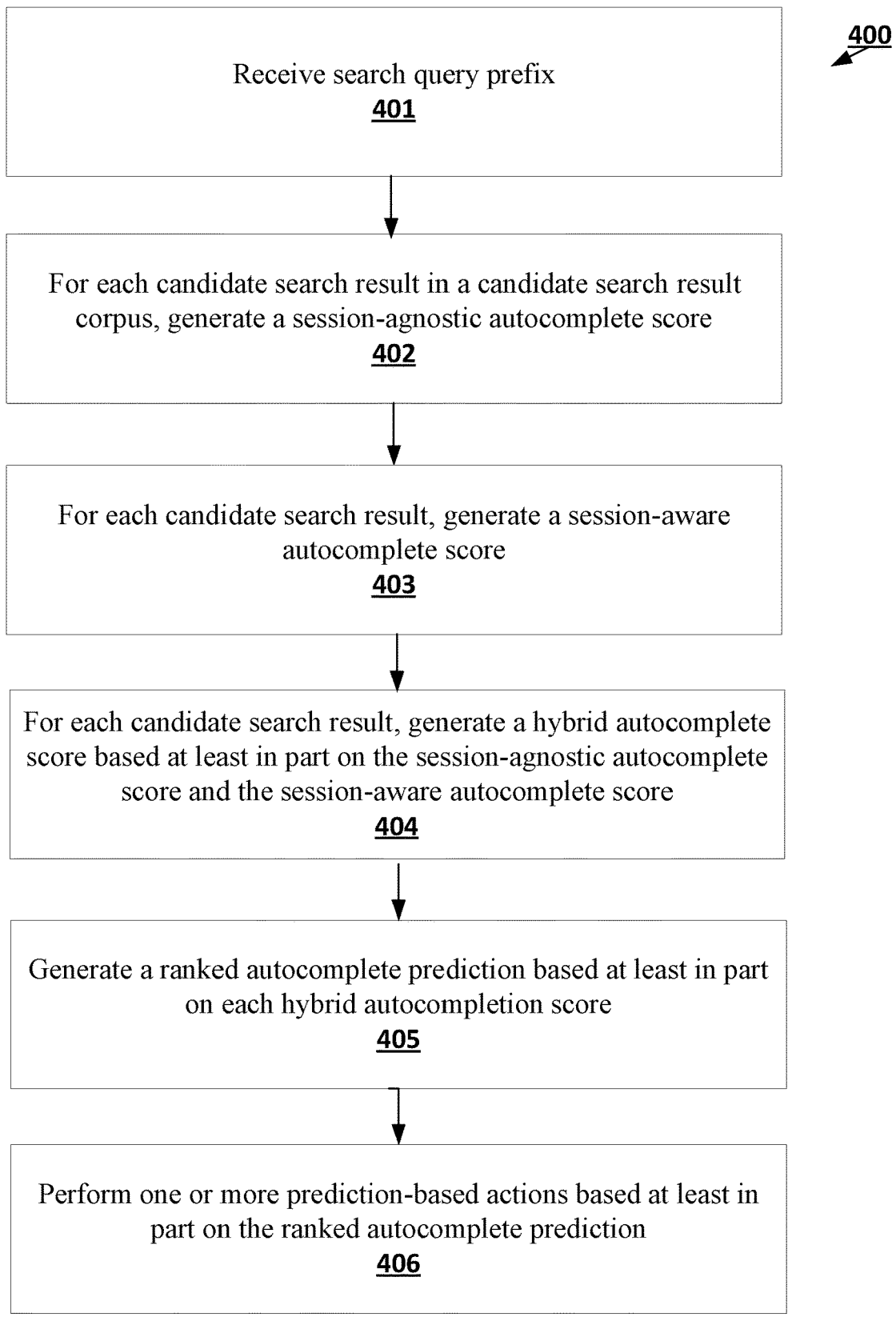
FIG. 4 provides a flowchart diagram of an example process for generating a ranked autocomplete prediction for a search query prefix in accordance with some embodiments discussed herein.

FIG. 4 provides a flowchart diagram of an example process 400 for generating a ranked autocomplete prediction for a search query prefix by a query-generating user profile that is associated with a search query session data object and an individual curated search corpus for the query-generating user profile.

The process 400 begins at step/operation 401 when the autocomplete prediction generation computing entity 106 receives a search query prefix. A search query prefix may describe the beginning portion of a search query. In various embodiments, a search query may describe an information request by a user that is provided to a search platform (e.g., a search engine) configured to return information corresponding to the search query. In various embodiments, a search query may comprise text string (e.g., one or more words, one or more phrases, and/or the like). For example, a search query may comprise a word (e.g., shoe, car, and/or the like). As another example, a search query may comprise a phrase (e.g., hospitals near me, and/or the like). In some embodiments, each word of a search query may be referred to as a search term. In various embodiments a search term may comprise one or more words. In various embodiments, a search query may be entered into a search query box (e.g., user interface associated with a search platform) to receive information corresponding to the search query. In some embodiments, a search query may be entered into a search query box via keyboard, voice recognition, and/or the like. In various embodiments, a search query prefix may comprise one or more letters and/or characters entered by a user into a search query box, where the one or more letter and/or characters comprise a partial search query. For example, a user may enter "phys" into a search query box. In the noted example, "phys" may represent the search query prefix, where, for example, the complete search query may be "physical therapy near me".

In various embodiments, a search query prefix may be associated with a search query session, where a search query session may describe a defined window associated with one or more search queries with respect to a query generating user profile. In various embodiments a query generating user profile may comprise data associated with a given user. For example, in various embodiments, each user may be associated with a query generating user profile. It should be understood that in some embodiments, not all users may be associated with a query generating user profile. In various embodiments, for each user, the associated query generating user profile may comprise and/or represent a unique identifier for the respective user. For example, in some embodiments, for each user the associated query generating user profile may comprise a unique user identifier (e.g., 11111, AB234, DACC, and/or the like). Additionally or alternatively, in some embodiments, for each user, the associated query generating user profile may comprise the user's age, the user's gender, the user's demographic information, the user's hobbies, the user's health-related data, and/or other data associated with the user.

In some embodiments, a search query session may comprise each search query entered by a user during a defined window. For example, a search query session may comprise a single search query. As another example, a search query may comprise a series of search queries (e.g., a plurality of search queries). In some embodiments, the defined window may describe a period of time (e.g., 90 seconds, 300 seconds, 10 minutes, and/or the like). For example, consider where the defined window is 300 seconds, and a user enters a first search query at time T1 and enters a second search query at time T1+200 seconds. In the noted example, the first search query and the second search query may be associated with a first search query session. Accordingly, the search query prefix for the first search query and the search query prefix for the second search query may be associated the first search query session. Continuing with the same example, consider that the same user enters a third search query at time T1+400 seconds and a fourth search query at time T1+500, the third search query and the fourth search query along with the corresponding search query prefixes may be associated with a second search query session. In some embodiments, each search query (and corresponding search query prefix) may be associated with a login session with respect to a query generating user profile. Moreover, in various embodiments, one or more search query sessions may be associated with a login session with respect to a query-generating user profile. In various embodiments, a query-generating user profile may be associated with one or more search query sessions, where, as noted above a search query session may comprise one or more search queries.

At step/operation 402, for each candidate search result in a candidate search result corpus, the autocomplete prediction generation computing entity 106 generates a session-agnostic autocomplete score based at least in part on the search query prefix. In various embodiments, a candidate search result may describe a possible complete search query for the search query prefix. In some embodiments, a candidate search result corpus may comprise a general search corpus and an individual curated search corpus. A general search corpus may describe a list of non-user specific candidate search results. For example, in some embodiments, each candidate search result in a general search corpus may be considered a possible search query for any given user. In various embodiments, the general search corpus may be generated based at least in part on a plurality of users. For example, in some embodiments, the general search corpus may comprise historical search terms extracted from and/or otherwise generated based at least in part on a plurality of historical search queries associated with the plurality of users. In various embodiments, each candidate search result in a general search corpus may be associated with a general corpus historical frequency score that describes the frequency of occurrence of the candidate search result (e.g., historical search term) with respect to the plurality of historical search queries. For example, the general corpus frequency score may describe the number of times a given candidate search result occurred within search queries for all users over a defined period of time. In various embodiments, the general corpus frequency score may be determined with respect to a particular search platform (e.g., search engine).

In some embodiments, the autocomplete prediction generation computing entity 106 may be configured to store historical search query data (e.g., historical search terms, and/or other data) associated with each user of the plurality of users, and generate the general search corpus based at least in part on the stored historical search query data. In some embodiments, generating the general search corpus may comprise extracting the historical search terms from respective search queries and generating the general search corpus based at least in part on the extracted historical search terms, where the general search corpus may comprise each unique extracted historical search term. In some embodiments, generating a general search corpus may comprise filtering and/or deduplicating to generate a list of unique historical search terms. In various embodiments, generating the general search corpus is performed as a precursor step/operation. In some embodiments, the autocomplete prediction generation computing entity 106 may be configured to update (e.g., periodically) the general search corpus, where updating the general search corpus may comprise adding new historical search term(s), and/or removing historical search term(s) based at least in part on one or more criteria. In some embodiments, the general search corpus may comprise historical search terms associated with search queries within a defined period of time (e.g., last five years, last twenty years, and/or the like). It should be understood that in some embodiments, the general search corpus may be generated by one or more other computing entities (other than the autocomplete prediction generation computing entity 106), and in some embodiments, the autocomplete prediction generation computing entity 106 may be configured cause one or more other computing entities to store and/or generate the general search corpus, which may then be provided to the autocomplete prediction generation computing entity 106.

In some embodiments, a general search result corpus trie data object may be generated based at least in part on the general search corpus. For example, in some embodiments, the autocomplete prediction generation computing entity 106 may be configured to generate the general search result corpus trie data object, where the general search result corpus trie data object may be generated based at least in part on all search terms, metadata and their n-grams associated with the general search corpus. A general search result corpus trie data object may describe a tree data structure comprising a plurality of nodes arranged in a hierarchical manner, wherein a node may comprise one or more characters that extends a character sequence represented by the parent node. In some embodiments, each candidate search result of the plurality of candidate search results in the general search corpus may be stored or otherwise represented in a respective leaf node (e.g., node without child nodes) of the general search result corpus trie data object. The path to a leaf node (e.g., one or more connected branches) may comprise one or more intermediate nodes (e.g., nodes between the root node and the leaf node), where an intermediate node may comprise one or more characters that extends a character sequence represented by the parent node and may or may not comprise a search query prefix. In some embodiments, each leaf node of the general search result corpus trie data object may be associated with a general corpus historical frequency score (as described above). In some embodiments, each leaf node and one or more intermediate nodes may comprise a candidate search result and/or may be associated with a general corpus historical frequency score (as described above).

In some embodiments, the step/operation 402 may be performed in accordance with the process 402A that is depicted in FIG. 5, which is an example process for generating a session-agnostic autocomplete score for a particular candidate search result based at least in part on a general search corpus. The process 402A begins at step/operation 501 when the autocomplete prediction generation computing entity 106 determines whether the particular candidate search result is in the general search corpus. In various embodiments, determining whether the particular candidate search result is in the general search corpus may comprise determining whether a node of the plurality of nodes of the general search result corpus trie data object comprises the search query prefix (e.g., whether the one or more characters of a given node matches the one or more characters of a search query prefix), and in response to determining a matching node, traversing the sub-trees linked to the matching node to determine and/or identify associated leaf node, where the associated leaf node may comprise the particular candidate search result. In some embodiments, a matching node may be associated with one or more leaf nodes, where each leaf node comprises a candidate search result. For example, the general search result corpus trie data object may comprise one or more sets of hierarchical intermediate nodes between the matching node and one or more leaf nodes of the general search result corpus trie data object.

At step/operation 502, in response to determining that the particular candidate search result is in the general search corpus, the autocomplete prediction generation computing entity 106 generates the trie-based frequency score for the particular candidate search result. In some embodiments, generating the trie-based frequency score for the particular candidate search result comprise determining the general corpus historical frequency score for the candidate search result, and selecting the general corpus historical frequency score for the candidate search result as the trie-based frequency score for the particular candidate search result. As described above, in some embodiments, each leaf node of the general search result corpus trie data object may be associated with a general corpus historical frequency score.

In some embodiments, the autocomplete prediction generation computing entity 106 may be configured to generate the trie-based frequency score for the particular candidate search result based at least in part on (i) whether the particular candidate search result is in a qualifying trie leaf node subset of the general search result corpus trie data object and (ii) the general corpus historical frequency score for the candidate search result. In some embodiments, the particular candidate search result may be determined to be in a qualifying trie leaf node subset of the general search result corpus trie data object if the candidate search result is in a leaf node. Additionally or alternatively, in some embodiments, a candidate search result may be deemed to be in a qualifying trie leaf node subset of the general search result corpus trie data object based at least in part on or more factors/criteria (e.g., whether the general corpus historical frequency score for leaf node storing the candidate search result satisfies a threshold frequency score, and/or the like). In various embodiments, in response to determining that the particular candidate search result is in a qualifying trie leaf node subset, the autocomplete prediction generation computing entity 106 generates the historical trie-based frequency score, where generating the historical trie-based frequency score may comprise selecting the general corpus historical frequency score for the particular candidate search result as the trie-based frequency score for the particular candidate search result.

At step/operation 503, the autocomplete prediction generation computing entity 106 generates the session-agnostic autocomplete score based at least in part on the trie-based frequency score for the particular candidate search result. In some embodiments, generating the session-agnostic autocomplete score may comprise selecting the trie-based frequency score for the particular candidate search result as the session-agnostic autocomplete score.

In some embodiments, the step 402 may be performed in accordance with the process 402B that is depicted in FIG. 6, which is an example process for generating a session-agnostic autocomplete score for a particular candidate search result based at least in part on an individual curated search corpus. The process 402B begins at step/operation 601 when the autocomplete prediction generation computing entity 106 determines whether the particular candidate search result is in the individual curated search result corpus. An individual curated search corpus may comprise user-specific data. For example, an individual curated search corpus may comprise data associated with a particular user. In some embodiments, the autocomplete prediction generation computing entity 106 may generate an individual curated search corpus for a user based at least in part on the user's historical search queries, the user's personal information, and/or other data associated with the user. In some embodiments, the autocomplete prediction generation computing entity 106 may generate an individual curated search corpus for a user based at least in part on the context and/or the search platform. For example, in some embodiments, such as a medical context, where search queries may be geared towards (e.g., related to) health-related inquiry (e.g., search queries performed on a health insurer website, health insurer search platform and/or the like), the autocomplete prediction generation computing entity 106 may generate an individual curated search corpus for a user based at least in part on the user's historical search queries, the user's personal information, provider history (e.g., healthcare provider history), and/or other data related data.

In some embodiments, generating the individual curated search corpus for a user, comprises receiving, retrieving, gathering, collecting, organizing and/or the like historical search terms associated with the user. In some embodiments, historical search terms associated with the user may be received, retrieved, gathered, collected, and/or the like based at least in part per search query session. For example, in some embodiments, each historical search term may be grouped and/or organized based at least in part on the search query session associated with the historical search term, where temporal information may be incorporated. In some embodiments, only historical search terms associated with a search query session that produced search result(s) may be included in the individual curated search corpus.

In some embodiments, the individual curated search corpus may comprise each historical search term associated with the user as well as augmented historical search terms. In various embodiments, the autocomplete prediction generation computing entity 106 may be configured to augment an historical search term based at least in part by generating one or more similar terms for the historical search term using one or more of a variety of techniques. For example, in some embodiments, the autocomplete prediction generation computing entity 106 may generate one or more similar terms for an historical search term using semantic embedding (e.g., word2vec, and/or the like), where the one or more similar terms may replace the historical search term in the augmented historical search terms. In some embodiments, for a sequential search query pair (e.g., in search query session), the autocomplete prediction generation computing entity 106 may be configured to replace only the first search query. For example, consider a sequential search query pair $[q_1, q_2]$. In the noted example, the autocomplete prediction generation computing entity 106 may be configured to replace only $q_1$, thus generating $[q_1^{new}, q_2]$. As noted above, in various embodiments, the individual curated search corpus comprises each historical search term associated with the user, as well as the augmented historical search terms.

Additionally, in various embodiments, generating the individual curated search corpus for a user, comprises receiving, retrieving, gathering, collecting, and/or the like personal information associated with the user. For example, in the noted medical context example, the autocomplete prediction generation computing entity 106 may be configured to retrieve and/or retrieve, the user's name under a healthcare plan (e.g., health insurance plan), the user's historical healthcare-related diagnosis, the user's historical healthcare-related procedures, the user's historical healthcare-related events (e.g., hospital visit, doctor visit, pharmacy visit, and/or the like) and/or associated temporal information (e.g., date and/or time), user's historical healthcare-related claims (e.g., health insurance claims) and/or associated temporal information (e.g., date and/or time).

In some embodiments, the user's historical healthcare-related diagnosis and/or historical healthcare related procedures may be augmented. In various embodiments, the autocomplete prediction generation computing entity 106 may be configured to augment the user's historical healthcare-related diagnosis data and/or historical healthcare-related procedures data based at least in part by generating the top-most similar terms with respect to the user's historical healthcare-related diagnosis data and/or historical healthcare-related procedures data using one or more of a variety of techniques (e.g., semantic embedding such as word2vec, and/or the like).

Continuing with the medical context example, additionally, in various embodiments, generating the individual curated search corpus for a user may comprise receiving, retrieving, gathering, collecting, and/or the like provider history information associated with the user. For example, in some embodiments, the autocomplete prediction generation computing entity 106 may be configured to retrieve and/or retrieve, for each historical visit (e.g., doctor visit, hospital visit, and/or the like) by the user, the respective visited provider designator(s) (e.g., provider names, physician names), visit location designator (e.g., hospital name, pharmacy name, and/or the like), and/or other provider history data. In some embodiments, the provider history portion of the individual curated search corpus may be expanded based at least in part on one or more provider qualification criteria (e.g., location criteria, and/or the like). For example, in some embodiments, the autocomplete prediction generation computing entity 106 identifies and/or determines for each visited provider designator, one or more qualified related provider designators that satisfy one or more provider qualification criteria and adds the identified and/or determined one or more qualified related provider designators to the individual curated corpus. In some embodiments, the one or more provider qualification criteria comprises a category criterion, a location criterion characterized by a location feature for the query-generating user profile/user, and/or the like.

For example, in some embodiments, the provider history portion of the individual curated search corpus may be expanded to include provider designators for providers with the same or similar specialty as the visited provider designators associated with the user's historical visits, provider designators for providers in the same provider network/group as the visited provider designators associated with the user's historical visits, provider designators for providers with the same zip code as the visited provider designators associated with the user's historical visits. In some embodiments, provider links may be tagged along with the terms.

At step/operation 602, in response to determining that the candidate search result is in the individual curated search corpus, the autocomplete prediction generation computing entity 106 generates an edit distance measure between the search query prefix and the particular candidate search result. In some embodiments, the autocomplete prediction generation computing entity 106 may generate the edit distance measure between the search query prefix and the particular candidate search result utilizing Levenshtein distance method/technique. See *Personalized Online Spell Correction for Personal Search*, at p. 4-5.

At step/operation 603, the autocomplete prediction generation computing entity 106 generates the session-agnostic autocomplete score based at least in part on the edit distance measure. In some embodiments, generating the session-agnostic autocomplete score based at least in part on the edit distance measure may comprise selecting the generated edit distance measure (e.g., in step/operation 603) as the session-agnostic autocomplete score.

In some embodiments, where a particular candidate search result is both in the individual curated search corpus and in the general search corpus, the autocomplete prediction generation computing entity 106 may be configured to give more weight to the individual curated search corpus. For example, in some embodiments, where a particular candidate search result is both in the individual curated search corpus and in the general search corpus, the autocomplete prediction generation computing entity 106 generates the session-agnostic autocomplete score based at least in part on the individual curated search corpus, where generating the session-agnostic autocomplete score may comprise selecting the edit distance measure as the session agnostic autocomplete score. As another example, in some embodiments, where a particular candidate search result is both in the individual curated search corpus and in the general search corpus, the autocomplete prediction generation computing entity 106 generates the session-agnostic autocomplete score for the particular candidate search result by combining the trie-based frequency score and the edit distance measure in accordance with a trie-based frequency score weight measure and an edit distance weight measure. For example, in some embodiments, the session agnostic autocomplete score may be a weighted sum of the trie-based frequency score and the edit distance measure for the corresponding candidate search result. In some embodiments, the edit distance weight measure may exceed the trie-based frequency score weight measure.

In some embodiments, where a user may not be associated with an individual curated search corpus (e.g., a new user logging on for the first time), the autocomplete prediction generation computing entity 106 may be configured to generate the session-agnostic autocomplete score based at least in part on the general search corpus (thus, the trie-based frequency score), where generating the session-agnostic autocomplete score may comprise selecting the trie-based frequency score as the session-agnostic autocomplete score.

Returning to FIG. 4 at step/operation 403, the autocomplete prediction generation computing entity 106 generates, for each candidate search result, a session-aware autocomplete score. In various embodiments, the session aware autocomplete score is generated based at least in part on the search query prefix (e.g., current search query in the search query session) and a search query session data object. In various embodiments, the search query session data object may describe the previous search query in the search query session relative to the search query prefix. For example, consider a search query session associated with a particular query generating user profile, where the last search query in the search query session is "acne treatment" and next entry by the user is search query prefix "cli". In the noted example, the autocomplete prediction generation computing entity 106 may generate the session-aware autocomplete score for the search query prefix "cli" using the search query session data object "acne treatment" (e.g., previous search query) and the search query prefix "cli".

In some embodiments, the autocomplete prediction generation computing entity 106 generates the autocomplete score based at least in part on the search query prefix in the search query session and the search query session data object, utilizing an extreme multi-label ranking model that is trained based at least in part on sets of previous search queries and search query session data object". See Yadav et.al. *Session Aware Query Auto-completion using Extreme Multi-Label Ranking.*

In various embodiments, generating the session-aware autocomplete score utilizing the extreme multi-label ranking model comprises generating search result clusters, where the search result clusters are generated based at least in part by clustering the candidate search results. A search result cluster may describe a grouping of candidate search results based at least in part on one or more criteria (e.g., similarity, shared search query prefix, and/or the like). The search result clusters may be generated using one or more of a variety of techniques (e.g., hierarchical-two means clustering, fixed-height trie data object, fixed-height trie data object+hierarchical two-means clustering, and/or the like). See Yadav et.al. *Session-Aware Query Auto-completion using Extreme Multi-Label Ranking.*

For example, in some embodiments, the search result clusters are generated using hierarchical-two means clustering technique, where generating the search result clusters comprises: (i) generating a fixed-size search result representations (e.g., embedding) for candidate search results in the candidate search result corpus and (ii) performing one or more two-means clustering operations on the fixed-size representations for the candidate search results to generate the search result clusters. The fixed-size search result representations may describe a fixed-size vector representation that is associated with semantic characteristics of candidate search results. For example, the fixed-size search result representations may be in the form of an n-dimensional vector of semantic features of a candidate search result. In some embodiments, the fixed-size search result representations may be generated using one or more of a variety of techniques. In some embodiments, the autocomplete prediction generation computing entity 106 generates the fixed-size search result representations for candidate search results using a term frequency-inverse document frequency (TF-IDF) technique. In some embodiments, the autocomplete prediction generation computing entity 106 generates the fixed-size search result representations for candidate search results using positioned-weighted term frequency-inverse document frequency (TF-IDF) technique. In some embodiments, subsequent to generating the fixed-size representations for the candidate search results, the autocomplete prediction generation computing entity 106 generates search result clusters based at least in part by performing one or more two-means clustering operations on the fixed-size representations for the candidate search results. In some embodiments, the autocomplete prediction generation computing entity 106 performs the one or more clustering operations on the fixed-size representations to generate the search results based at least in part on similarity measures (e.g., cosine similarity measures, Euclidean-based distance measure, and/or the like). For example, in some embodiments, performing the one or more hierarchical two-means clustering operations may comprise generating pair-wise similarity measures between pairs of fixed-size representations for the candidate search results.

As another example, in some embodiments, the search result clusters are generated based at least in part by constructing a fixed-height candidate search result corpus trie data object for the candidate search results. A fixed-height candidate search result corpus trie data object may describe a trie data structure having a fixed height, where the fixed height may describe the depth of the trie data structure (e.g., depth of the tree). In some embodiments, the selected height/depth may be 1, 2, 4, 10, and/or the like. The fixed-height candidate search result corpus trie data object may comprise a plurality of nodes arranged in a hierarchical manner, where a node may store one or more characters that extends a character sequence represented by the parent node (as described above with respect to the general search result corpus trie data object). Each leaf node at the depth (e.g., selected height) of the fixed-height candidate search result corpus trie data object for the candidate search results may comprise a search result cluster comprising one or more candidate search results of the plurality of candidate search results, where each search result cluster may be associated with one or more search query prefixes (e.g., parent nodes, grandparent node, and/or the like) that correspond to the candidate search results in the respective search result cluster.

In some embodiments, to generate the fixed-height candidate search result corpus trie data object for the candidate search results, the autocomplete prediction generation computing entity 106 may (i) construct a candidate search result corpus trie data object for the candidate search results, where each candidate search result is stored in a leaf node, and (ii) generate a fixed-height trie data object for the candidate search results based at least in part on the candidate search result corpus trie data object. For example, in some embodiments, for each sub-tree at the selected height (e.g., depth) of the candidate search result corpus trie data object for the candidate search results, the autocomplete prediction generation computing entity 106 may collapse the respective sub-tree into a corresponding single leaf node at the selected height of the candidate search result corpus trie data object to generate a fixed height candidate search result corpus trie data object, where the corresponding single leaf node at the selected height of the trie data object may comprise all the candidate search results in the sub-tree, and may represent a search result cluster of one or more search result clusters of the fixed-height candidate search result corpus trie data object. For example, consider, where a candidate search result corpus trie data object comprises n sub-trees, the autocomplete prediction generation computing entity 106 may generate a fixed-height candidate search result corpus trie data object comprising n leaf nodes each representing a search result cluster comprising one or more candidate results (thus, n search result clusters).

As another example, in some embodiments, the autocomplete prediction generation computing entity 106 may generate the search result clusters based at least in part by (i) constructing a candidate search result corpus trie data object for the candidate search results (e.g., as described above), and (ii) for each sub-tree below a selected height (e.g., depth) of the candidate search result corpus trie data object for the candidate search results, performing one or more hierarchical two-means clustering (e.g., as described above) on the candidate search results in the sub-trees. In some embodiments, the selected height/depth may be 1, 2, 4, 10, and/or the like.

In some embodiments, the step/operation 403 may be performed in accordance with the process that is depicted in FIG. 7, which is an example process for generating a session-aware autocomplete score for a particular candidate search result. The process that is depicted in FIG. 7 begins at step/operation 701 when the autocomplete prediction generation computing entity 106 identifies a corresponding search result cluster for the candidate search result. In some embodiments, identifying a corresponding search result cluster for the candidate search result may comprise determining which search result cluster of the plurality of search result clusters includes the particular candidate search result.

At step/operation 702, the autocomplete prediction generation computing entity 106 determines whether the corresponding search result cluster is in a qualifying search result cluster set for the search query prefix. The autocomplete prediction generation computing entity 106 may determine whether the corresponding search result cluster is in a qualifying search result cluster set for the search query prefix based at least in part on the clustering technique used to generate the search result clusters. For example, in some embodiments, the qualifying search result cluster set comprises each search result cluster that is generated by performing one or more two-means clustering operations on fixed-size search result representations for candidate search results in the candidate search result corpus. As another example, in some embodiments, the qualifying search result cluster set comprises each search result cluster that: (i) corresponds to the search query prefix, and (ii) is generated by performing one or more two-means clustering operations on fixed-size search result representations for candidate search result in the candidate search result corpus that are associated with a fixed-size cluster-level prefix.

In some embodiments, the qualifying search result cluster set comprises each search result cluster that: (i) corresponds to a leaf node of a fixed-height candidate search result corpus trie data object, and (ii) corresponds to the search query prefix.

In some embodiments, the qualifying search result cluster set comprises each search result cluster that: (i) corresponds to a leaf node of a candidate search result corpus trie data object, and (ii) is generated by performing one or more two-means clustering operations on fixed-size search result representations for candidate search results in the candidate search result corpus.

At step/operation 703, in response to determining that the corresponding search result cluster is in the qualifying search result cluster, the autocomplete prediction generation computing entity 106 generates a per-cluster match result indicator for the corresponding search result cluster. In some embodiments, the autocomplete prediction generation computing entity 106 generates the per-cluster match result indicator for the corresponding search result cluster based at least in part on the search query prefix and the search query session data object and using a per-cluster matching machine learning model. In various embodiments, the input to the per-cluster machine learning model is the search query prefix (e.g., current search query prefix) and the search query session data object (e.g., previous search query) in the current search query session. In various embodiments, the output of the per-cluster matching machine learning model is a per-cluster match result indicator with respect to a particular search result cluster, where the per-cluster match result indicator may be an affirmative per-cluster match result indicator or a negative per-cluster match result indicator. An affirmative per-cluster match result indicator may describe or otherwise be indicative that the set of search query prefix and corresponding search query session data object match the particular search result cluster. A negative per-cluster match result indicator may describe or otherwise be indicative that the search query prefix and the corresponding search query session data do not match the particular search result cluster.

In various embodiments, the per-cluster machine learning model is trained based at least in part on training data that comprises a plurality of input training data sets, where each training data set comprises an historical search query session data object and corresponding historical next search query prefix, along with a ground truth value, Each set of historical search query session data object and historical next search query prefix may describe the training input. For each training data set, the historical search query session data object may describe a search query in a particular historical search query session, and the historical next search query prefix may describe the immediately following search query prefix in the particular historical search query session. For each training data set, the corresponding ground truth value may describe a search query for the historical next search query prefix in the training data set. For example, consider an historical search query session that comprises a search query "acne treatment" followed by a search query prefix "cli" for the search query "clindamycin". In the noted example, a training data set may comprise the "acne treatment" and "cli" as training input to the per-cluster matching machine learning model, and the corresponding ground truth value may comprise "clindamycin". In some embodiments, each training data set may comprise vector representations (e.g., embedding) of the input training data (e.g., historical search query session data object and historical next search query prefix) in the training data set. In various embodiments, the vector representations of the input training data may be generated using one or more of a variety of techniques (e.g., TF-IDF, and or the like). In some embodiments, the input training data for each training data may comprise a vector representation of the combination of the corresponding historical search query session data object and historical next search query prefix.

At step/operation 704, in response to determining that the cluster match result indicator is an affirmative per-cluster match result indicator for the corresponding search result cluster, the autocomplete prediction generation computing entity 106 generates, using a cross-cluster ranking machine learning model, a qualifying result ranking score for the candidate search result within a qualifying search result subset of the candidate search result corpus that are associated with search result clusters having affirmative per-cluster result indicators, where the per cross-cluster ranking machine learning model may be a trained machine learning model that is trained/configured to generate a qualifying result ranking score for each candidate search result in a search result cluster. For example, in various embodiments, the per cross-cluster ranking machine learning model generates the qualifying result ranking score for a candidate search result based at least in part on a learned a ranking function. A qualifying result ranking score may be indicative of how close the corresponding candidate search result matches the search query prefix taking into the account the previous search query in the search query session.

At step/operation 705, the autocomplete prediction generation computing entity 106 generates the session-aware autocomplete score based at least in part on the qualifying result ranking score for the candidate search result. In some embodiments, generating the session-aware autocomplete score based at least in part on the qualifying result ranking score for the candidate search result comprises selecting the qualifying result ranking score as the session-aware autocomplete score.

In some embodiments, the step/operation 403 may be performed in accordance with the process that is depicted in FIG. 8, which is an example process for generating a session-aware autocomplete score for a particular candidate search result. The process that is depicted in FIG. 8 begins at step/operation 801 when the autocomplete prediction generation computing entity 106 generates, based at least in part on the search query prefix and the search query session data object and using a per-cluster matching machine learning model, a relevant search result cluster subset of the plurality of search result clusters. In some embodiments, a relevant search result cluster subset may describe and/or comprise search result clusters comprising one or more candidate search results that match the search query prefix in the context of the search query session data object.

In various embodiments, the input to the per-cluster machine learning model is the search query prefix (e.g., current search query prefix) and the search query session data object (e.g., the previous search query) in the current search query session. In various embodiments, the output of the per-cluster matching machine learning model is a subset of search result clusters.

In various embodiments, the per-cluster machine learning model is trained based at least in part on training data that comprises a plurality of input training data sets, where each training data set comprises an historical search query session data object and corresponding historical next search query prefix, along with a ground truth value (as described above with respect to FIG. 7). Each set of historical search query session data object and historical next search query prefix may describe the training input. For each training data set, the historical search query session data object may describe a search query in a particular historical search query session, and the historical next search query prefix may describe the immediately following search query prefix in the particular historical search query session. For each training data set, the corresponding ground truth value may describe search query for the historical next search query prefix in the training data set. For example, consider an historical search query session that comprises a search query "acne treatment" followed by a search query prefix "cli" for the search query "clindamycin". In the noted example, a training data set may comprise the "acne treatment" and "cli" as training input to the per-cluster matching machine learning model, and the corresponding ground truth value may comprise "clindamycin". In some embodiments, each training data set may comprise vector representations (e.g., embedding) of the input training data (e.g., historical search query session data object and historical next search query prefix) in the training data set. In various embodiments, the vector representations of the input training data may be generated using one or more of a variety of techniques (e.g., TF-IDF, and or the like). In some embodiments, the input training data for each training data may comprise a vector representation of the combination of the corresponding historical search query session data object and historical next search query.

At step/operation 802, the autocomplete prediction generation computing entity 106 generates, based at least in part on the search query prefix and the search query session data object, and using a cross-cluster ranking machine learning model, a qualifying result ranking score for each candidate search result within the relevant search result cluster subset, where a qualifying result ranking score may be indicative of how close the corresponding candidate search result matches the search query prefix taking into the account the previous search query in the search query session. The per cross-cluster ranking machine learning model, as described above, may be a trained machine learning model that is trained/configured to generate a qualifying result ranking score for each candidate search result in a search result cluster. For example, in various embodiments, the per cross-cluster ranking machine learning model generates the qualifying result ranking score for a candidate search result based at least in part on a learned a ranking function. In various embodiments, the input to the cross-cluster ranking machine learning model may be the search query prefix and the search query session data object, as well as each candidate search result within the relevant search result cluster subset. In various embodiments, the output of the cross-cluster ranking machine learning model is a ranking score (e.g., qualifying result ranking score) for each candidate search result within the relevant search result cluster subset and/or a ranked list of the candidate search results within the relevant search result cluster subset.

At step/operation 803, the autocomplete prediction generation computing entity 106 generates a session-aware autocomplete score for each candidate search result based at least in part on the qualifying result ranking score for the candidate search result. In some embodiments, generating a session-aware autocomplete score for each candidate search result may comprise selecting the qualifying result ranking score as the session-aware autocomplete score.

Returning to FIG. 4 at step/operation 404, for each candidate search result, the autocomplete prediction generation computing entity 106 generates a hybrid autocomplete score based at least in part on the session-agnostic autocomplete score and the session-aware autocomplete score. In various embodiments, the autocomplete prediction generation computing entity 106 may generate the hybrid autocomplete score for a candidate search result based at least in part by combining (e.g., performing one or more sum operations) the session-agnostic autocomplete score and the session-aware autocomplete score. In some embodiments, the session-agnostic autocomplete score may be a weighted sum of the session-agnostic autocomplete score and the session-aware autocomplete score. In some embodiments, the weight measure for the session-aware autocomplete score may exceed the weight measure for the session-agnostic autocomplete score.

As described above, in some embodiments, the session-agnostic autocomplete score for a candidate search result may be generated based at least in part on the trie-based frequency score for the candidate search result, and/or based at least in part on the edit distance measure for the candidate search result with respect to the search query prefix if the corresponding query generating user profile is associated with an individual curated search corpus. For example, in some embodiments, the session-agnostic score for a candidate search result may be generated based at least in part on a weighted sum of the trie-based frequency score for the candidate search result and the edit distance measure for the candidate search result.

In some embodiments, the autocomplete prediction generation computing entity 106 may be configured to generate for a candidate search result (i) a first session-agnostic autocomplete score based at least in part on trie-based frequency score for the candidate search result; and (ii) generate a second session-agnostic autocomplete score based at least in part on the edit distance measure for the candidate search result with respect to the search query prefix if the corresponding query generating user profile is associated with an individual curated search corpus; (iii) generate a session-aware autocomplete score for one or more candidate search results if the search query prefix is associated with a search query session; and (iv) generate the hybrid autocomplete score based at least in part on the first session-agnostic autocomplete score, the second session-agnostic autocomplete score, and the session-aware autocomplete score, where the hybrid autocomplete score may be a weighted sum of the first session-agnostic autocomplete score, the second session-agnostic autocomplete score, and the session-aware autocomplete score.

As discussed above, in some embodiments, the hybrid score autocomplete score may be based at least in part on or more of the first session-agnostic autocomplete score, the second session-agnostic autocomplete score, and the session-aware autocomplete score based at least in part on one or more criteria (e.g., whether the an individual curated search corpus exist for the query generating user profile, whether the search query prefix is associated with a search query session and whether there is a previous search query with respect to the search query prefix in the search query session).

At step/operation 405, the autocomplete prediction generation computing entity 106 generates a ranked autocomplete prediction based at least in part on each hybrid autocomplete score. In some embodiments, generating the ranked autocomplete prediction may comprise ranking each candidate search result or ranking a subset of candidate search results based at least in part on the hybrid autocomplete score for each candidate search result, where a first candidate search result with a higher hybrid autocomplete score relative to a second candidate search result may have or otherwise be associated with a higher ranking value relative to the second candidate search result. The ranked autocomplete prediction may comprise a subset of candidate search results based at least in part on respective hybrid autocomplete score for each candidate search results. For example, in some embodiments, the ranked autocomplete prediction may comprise a subset of top N ranked candidate search results, where N may be configurable. In some embodiments, N may be 3, 5, 10, 20, and/or the like. Additionally or alternatively, in some embodiment, ranked autocomplete predicted may be generated based at least in part on a ranking value threshold, where the ranked autocomplete prediction may comprise a subset of candidate search result whose hybrid autocomplete score satisfies a ranking value threshold (e.g., top N candidate search results whose hybrid autocomplete score satisfies the ranking value threshold).

Figure 9:
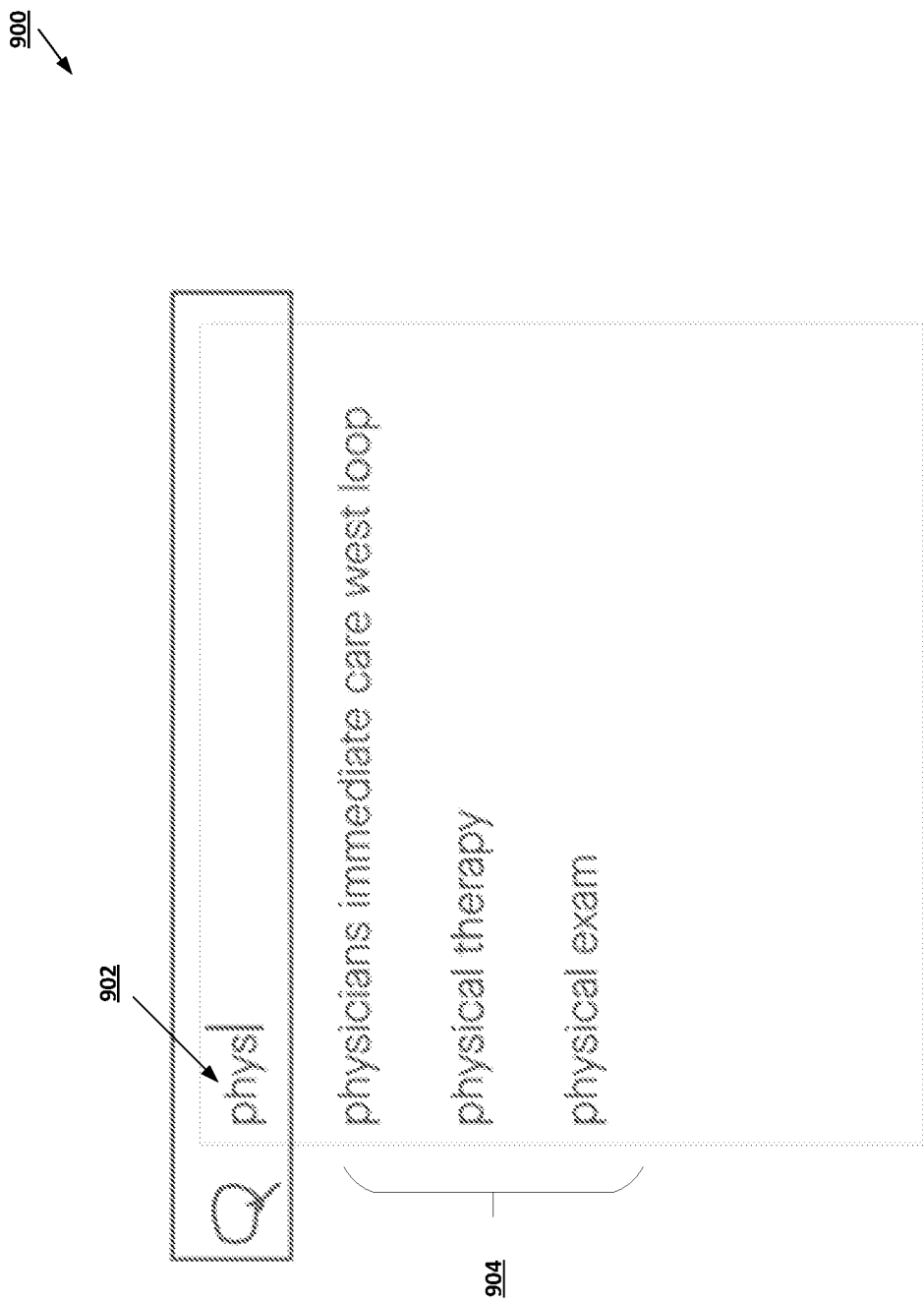
FIG. 9 provides an operational example of a prediction output user interface in accordance with some embodiments discussed herein.

At step/operation 406, the autocomplete prediction generation computing entity 106 performs one or more prediction-based actions based at least in part on the ranked autocomplete prediction. In some embodiments, performing the one or more prediction-based actions may comprise generating user interface data for a prediction output user interface that displays the ranked autocomplete prediction (e.g., top N ranked candidate search results). An operational example of such a prediction output user interface 900 is depicted in FIG. 9. As shown in FIG. 9 the user interface may comprise a drop-down box configured to display the ranked autocomplete prediction 904 in accordance with their ranking value (e.g., in descending order of highest ranking value first). The user interface may also be configured to display the search query prefix 902 as shown in FIG. 9.

As described above, various embodiments of the present invention provide machine learning solutions for improving search accuracy in a search platform that is configured to generate search results for search queries that enables gathering insights from multiple ranking mechanisms to generate autocomplete suggestions for partial search query. This leads to a search platform that can enable a user to formulate semantically-enriched search queries. In this way, various embodiments of the present invention reduce the need for end-users of search platforms to do repeated search operations with more precise search queries, which in turn reduces the overall number of search queries transmitted to a search platform and hence the operational load of the search platform. In this way, by reducing the operational load on search platforms, various embodiments of the present invention improve operational reliability and computational efficiency of search platforms.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
receiving, by one or more processors, a search query prefix;
generating, by the one or more processors, a set of session-agnostic autocomplete scores for a set of candidate search results by:
generating a first subset of the set of session-agnostic autocomplete scores for a first subset of the set of candidate search results within an individual curated search corpus based at least in part on an edit distance measure between the search query prefix and each of the first subset of the set of candidate search results, and
generating a second subset of the set of session-agnostic autocomplete scores for a second subset of the set of candidate search results within a general search result corpus based at least in part on a trie-based frequency score that is generated based at least in part on one or more qualifying trie leaf node subsets of a general search result corpus trie data object for the general search result corpus and a general corpus historical frequency score for each of the second subset of the set of candidate search results;
generating, by the one or more processors, a set of session-aware autocomplete scores for the set of candidate search results;
generating (i) a weighted set of session-agnostic autocomplete scores by applying a first weight measure to the set of session-agnostic autocomplete scores and (ii) a weighted set of session-aware autocomplete scores by applying a second weight measure to the set of session-aware autocomplete scores, wherein the first weight measure exceeds the second weight measure; and
wherein (i) a weighted summation, of the set of weighted summations, for the candidate search result comprises a weighted combination of at least one weighted session-agnostic autocomplete score of the weighted set of session-agnostic autocomplete scores and at least one weighted session-aware autocomplete score of the weighted set of session-aware autocomplete scores, and (ii) a weight of the weighted combination is based at least in part on a presence of the candidate search result within the individual curated search corpus or the general search result corpus;
generating, by the one or more processors, a set of hybrid autocomplete scores for the set of candidate search results based at least in part on the set of weighted summations between the first subset of the set of session-agnostic autocomplete scores, the second subset of the set of session-agnostic autocomplete scores, and the set of session-aware autocomplete scores, wherein the set of weighted summations is based at least in part on one or more locations of a candidate search result of the set of candidate search results, and the one or more locations comprise the individual curated search corpus or the general search result corpus;
generating, by the one or more processors, a ranked autocomplete prediction based at least in part on the set of hybrid autocomplete scores; and
initiating, using the one or more processors, the performance of one or more prediction-based actions based at least in part on the ranked autocomplete prediction.

2. The computer-implemented method of claim 1, wherein generating a session-aware autocomplete score of the set of session-aware autocomplete scores for the candidate search result of the set of candidate search results comprises:
identifying a search result cluster for the candidate search result;
determining that the search result cluster is in a qualifying search result cluster set for the search query prefix, wherein the qualifying search result cluster set comprises each search result cluster of a set of search result clusters that is generated by performing one or more two-means clustering operations on fixed-size search result representations for the set of candidate search results in a candidate search result corpus;
in response to determining that the search result cluster is in the qualifying search result cluster, generating, using a per-cluster matching machine learning model for the search result cluster, a per-cluster match result indicator for the search result cluster, and
in response to determining that the per-cluster match result indicator for the search result cluster is an affirmative per-cluster match result indicator:
(a) generating, using a cross-cluster ranking machine learning model, a qualifying result ranking score for the candidate search result, and
(b) generating the session-aware autocomplete score for the candidate search result based at least in part on the qualifying result ranking score.

3. The computer-implemented method of claim 2, wherein the qualifying search result cluster set comprises each search result cluster that: (i) corresponds to a leaf node of a height-fixed candidate search result corpus trie data object, and (ii) corresponds to the search query prefix.

4. The computer-implemented method of claim 1, wherein the individual curated search corpus comprises: (i) one or more visited provider designators for a query-generating user profile associated with the search query prefix, and (ii) for each visited provider designator, one or more related provider designators.

5. The computer-implemented method of claim 1, wherein the individual curated search corpus comprises: (i) one or more visited provider designators for a query-generating user profile associated with the search query prefix, and (ii) for each visited provider designator, one or more qualified related provider designators that satisfy one or more provider qualification criteria.

6. The computer-implemented method of claim 5, wherein the one or more provider qualification criteria comprise a location criterion characterized by a location feature for the query-generating user profile associated with the search query prefix.

7. The computer-implemented method of claim 1, wherein the set of weighted summations is based at least in part on a trie-based frequency score weight measure and an edit distance weight measure.

8. The computer-implemented method of claim 7, wherein the edit distance weight measure exceeds the trie-based frequency score weight measure.

9. The computer-implemented method of claim 1, wherein the set of session-aware autocomplete scores for the set of candidate search results is based at least in part on a determination that the search query prefix is associated with a series of search queries over a period of time.

10. A system comprising one or more processors and at least one memory storing processor-executable instructions that, when executed by the one or more processors, cause the one or more processors to perform operations comprising:
  receiving a search query prefix;
  generating a set of session-agnostic autocomplete scores for a set of candidate search results by:
  generating a first subset of the set of session-agnostic autocomplete scores for a first subset of the set of candidate search results within an individual curated search corpus based at least in part on an edit distance measure between the search query prefix and each of the first subset of the set of candidate search results, and
  generating a second subset of the set of session-agnostic autocomplete scores for a second subset of the set of candidate search results within a general search result corpus based at least in part on a trie-based frequency score that is generated based at least in part on one or more qualifying trie leaf node subsets of a general search result corpus trie data object for the general search result corpus and a general corpus historical frequency score for each of the second subset of the set of candidate search results;
  generating a set of session-aware autocomplete scores for the set of candidate search results;
  generating (i) a weighted set of session-agnostic autocomplete scores by applying a first weight measure to the set of session-agnostic autocomplete scores and (ii) a weighted set of session-aware autocomplete scores by applying a second weight measure to the set of session-aware autocomplete scores, wherein the first weight measure exceeds the second weight measure; and
  wherein (i) a weighted summation, of the set of weighted summations, for the candidate search result comprises a weighted combination of at least one weighted session-agnostic autocomplete score of the weighted set of session-agnostic autocomplete scores and at least one weighted session-aware autocomplete score of the weighted set of session-aware autocomplete scores, and (ii) a weight of the weighted combination is based at least in part on a presence of the candidate search result within the individual curated search corpus or the general search result corpus;
  generating a set of hybrid autocomplete scores for the set of candidate search results based at least in part on the set of weighted summations between the first subset of the set of session-agnostic autocomplete scores, the second subset of the set of session-agnostic autocomplete scores, and the set of session-aware autocomplete scores, wherein the set of weighted summations is based at least in part on one or more locations of a candidate search result of the set of candidate search results, and the one or more locations comprise the individual curated search corpus or the general search result corpus;
  generating a ranked autocomplete prediction based at least in part on the set of hybrid autocomplete scores; and
  initiating the performance of one or more prediction-based actions based at least in part on the ranked autocomplete prediction.

11. The system of claim 10, wherein generating a session-aware autocomplete score of the set of session-aware autocomplete scores for the candidate search result of the set of candidate search results comprises:
  identifying a search result cluster for the candidate search result;
  determining that the search result cluster is in a qualifying search result cluster set for the search query prefix, wherein the qualifying search result cluster set comprises each search result cluster of a set of search result clusters that is generated by performing one or more two-means clustering operations on fixed-size search result representations for the set of candidate search results in a candidate search result corpus;
  in response to determining that the search result cluster is in the qualifying search result cluster, generating, using a per-cluster matching machine learning model for the search result cluster, a per-cluster match result indicator for the search result cluster, and
  in response to determining that the per-cluster match result indicator for the search result cluster is an affirmative per-cluster match result indicator:
  (a) generating, using a cross-cluster ranking machine learning model, a qualifying result ranking score for the candidate search result, and
  (b) generating the session-aware autocomplete score for the candidate search result based at least in part on the qualifying result ranking score.

12. The system of claim 11, wherein the qualifying search result cluster set comprises each search result cluster that: (i) corresponds to a leaf node of a height-fixed candidate search result corpus trie data object, and (ii) corresponds to the search query prefix.

13. The system of claim 10, wherein the individual curated search corpus comprises: (i) one or more visited provider designators for a query-generating user profile associated with the search query prefix, and (ii) for each visited provider designator, one or more related provider designators.

14. The system of claim 10, wherein the individual curated search corpus comprises: (i) one or more visited provider designators for a query-generating user profile associated with the search query prefix, and (ii) for each visited provider designator, one or more qualified related provider designators that satisfy one or more provider qualification criteria.

15. The system of claim 14, wherein the one or more provider qualification criteria comprise a location criterion characterized by a location feature for the query-generating user profile associated with the search query prefix.

16. The system of claim 10, wherein the set of weighted summations is based at least in part on a trie-based frequency score weight measure and an edit distance weight measure.

17. The system of claim 16, wherein the edit distance weight measure exceeds the trie-based frequency score weight measure.

18. One or more non-transitory computer-readable storage media including instructions that, when executed by one or more processors, cause the one or more processors to perform operations comprising:
  receiving a search query prefix; generating a set of session-agnostic autocomplete scores for a set of candidate search results by:
  generating a first subset of the set of session-agnostic autocomplete scores for a first subset of the set of candidate search results within an individual curated search corpus based at least in part on an edit distance measure between the search query prefix and each of the first subset of the set of candidate search results, and
  generating a second subset of the set of session-agnostic autocomplete scores for a second subset of the set of candidate search results within a general search result corpus based at least in part on a trie-based frequency score that is generated based at least in part on one or more qualifying trie leaf node subsets of a general search result corpus trie data object for the general search result corpus and a general corpus historical frequency score for each of the second subset of the set of candidate search results;

generating a set of session-aware autocomplete scores for the set of candidate search results;

generating (i) a weighted set of session-agnostic autocomplete scores by applying a first weight measure to the set of session-agnostic autocomplete scores and (ii) a weighted set of session-aware autocomplete scores by applying a second weight measure to the set of session-aware autocomplete scores, wherein the first weight measure exceeds the second weight measure; and wherein (i) a weighted summation, of the set of weighted summations, for the candidate search result comprises a weighted combination of at least one weighted session-agnostic autocomplete score of the weighted set of session-agnostic autocomplete scores and at least one weighted session-aware autocomplete score of the weighted set of session-aware autocomplete scores, and (ii) a weight of the weighted combination is based at least in part on a presence of the candidate search result within the individual curated search corpus or the general search result corpus;

generating a set of hybrid autocomplete scores for the set of candidate search results based at least in part on the set of weighted summations between the first subset of the set of session-agnostic autocomplete scores, the second subset of the set of session-agnostic autocomplete scores, and the set of session-aware autocomplete scores, wherein the set of weighted summations is based at least in part on one or more locations of a candidate search result of the set of candidate search results, and the one or more locations comprise the individual curated search corpus or the general search result corpus;

generating a ranked autocomplete prediction based at least in part on the set of hybrid autocomplete scores; and initiating the performance of one or more prediction-based actions based at least in part on the ranked autocomplete prediction.

* * * * *